(12) United States Patent
Patrick et al.

(10) Patent No.: US 11,360,920 B2
(45) Date of Patent: Jun. 14, 2022

(54) MAPPING HIGH-SPEED, POINT-TO-POINT INTERFACE CHANNELS TO PACKET VIRTUAL CHANNELS

(71) Applicant: Micron Technology, Inc., Boise, ID (US)

(72) Inventors: David Patrick, McKinney, TX (US); Tony Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/007,592

(22) Filed: Aug. 31, 2020

(65) Prior Publication Data

US 2022/0066969 A1 Mar. 3, 2022

(51) Int. Cl.
*G06F 13/38* (2006.01)
*G06F 13/40* (2006.01)
*H04L 45/74* (2022.01)
*G06F 13/42* (2006.01)

(52) U.S. Cl.
CPC ........ *G06F 13/385* (2013.01); *G06F 13/4031* (2013.01); *G06F 13/4282* (2013.01); *H04L 45/74* (2013.01)

(58) Field of Classification Search
None
See application file for complete search history.

(56) References Cited

U.S. PATENT DOCUMENTS 7,613,209 B1 11/2009 Nguyen et al.
9,946,462 B1 4/2018 Li et al.
2005/0251612 A1 11/2005 Creta et al.
2009/0261996 A1 10/2009 Itoh
2010/0153658 A1 6/2010 Duncan et al.
2011/0072177 A1 3/2011 Glasco et al.

(Continued)

FOREIGN PATENT DOCUMENTS

WO 2017196143 11/2017
WO 2019178813 9/2019

OTHER PUBLICATIONS

"WikiChip Fuse", 9 pages, Author: WikiChip LLC; Published: Jan. 4, 2020; Retrieved on: Apr. 22, 2021.*

(Continued)

*Primary Examiner* — Henry Tsai
*Assistant Examiner* — Christopher A Bartels
(74) *Attorney, Agent, or Firm* — Schwegman Lundberg & Woessner, P.A.

(57) ABSTRACT

Implementations of the present disclosure are directed to systems and methods for mapping point-to-point channels to packet virtual channels. A chip with an point-to-point interface converts point-to-point data to a packet format. The point-to-point channels are mapped to virtual channels of the packet transmission protocol. Information from multiple point-to-point channels may be combined in a single packet. Among the benefits of implementations of the present disclosure is that point-to-point devices may be connected to a packetized network without losing the benefits of separate channels for different types of communication. This allows existing point-to-point devices to communicate using a packetized network without internal modification or performance degradation.

24 Claims, 10 Drawing Sheets

(56) References Cited

U.S. PATENT DOCUMENTS

| | | | |
|---|---|---|---|
| 2012/0159037 A1* | 6/2012 | Kwon | G06F 13/4022 710/317 |
| 2013/0103783 A1 | 4/2013 | Mannava et al. | |
| 2014/0010364 A1 | 1/2014 | Shibutani et al. | |
| 2014/0365632 A1* | 12/2014 | Ishii | G06F 13/1663 709/223 |
| 2014/0369355 A1 | 12/2014 | Hori | |
| 2015/0052283 A1* | 2/2015 | Ishii | G06F 13/4282 710/309 |
| 2015/0109024 A1 | 4/2015 | Abdelfattah et al. | |
| 2016/0255048 A1 | 9/2016 | Ganesh et al. | |
| 2017/0310473 A1 | 10/2017 | Takiguchi et al. | |
| 2017/0322841 A1 | 11/2017 | Morris et al. | |
| 2018/0011759 A1 | 1/2018 | Willey et al. | |
| 2018/0307597 A1 | 10/2018 | Oh et al. | |
| 2019/0243700 A1* | 8/2019 | Brewer | G11C 7/1045 |
| 2019/0324928 A1 | 10/2019 | Brewer | |
| 2019/0332555 A1 | 10/2019 | Mcvay | |
| 2019/0340019 A1 | 11/2019 | Brewer | |
| 2019/0340020 A1 | 11/2019 | Brewer | |
| 2019/0340023 A1 | 11/2019 | Brewer | |
| 2019/0340024 A1 | 11/2019 | Brewer | |
| 2019/0340027 A1 | 11/2019 | Brewer | |
| 2019/0340035 A1 | 11/2019 | Brewer | |
| 2019/0340154 A1 | 11/2019 | Brewer | |
| 2019/0340155 A1 | 11/2019 | Brewer | |
| 2020/0151137 A1 | 5/2020 | Izenberg et al. | |
| 2020/0162191 A1 | 5/2020 | Yu et al. | |
| 2020/0274552 A1 | 8/2020 | Rigo et al. | |
| 2021/0142448 A1* | 5/2021 | Yao | G06N 3/0445 |

OTHER PUBLICATIONS

U.S. Appl. No. 17/007,748, filed Aug. 31, 2020, Multiple Protocol Header Processing.
U.S. Appl. No. 17/007,354, filed Aug. 31, 2020, Single Field for Encoding Multiple Elements.
U.S. Appl. No. 17/007,376, filed Aug. 31, 2020, Reduced Sized Encoding of Packet Length Field.
U.S. Appl. No. 17/007,492, filed Aug. 31, 2020, Transparent Packet Splitting and Recombining.
"International Application Serial No. PCT US2021 038698, International Search Report dated Oct. 1, 2021", 3 pgs.
"International Application Serial No. PCT US2021 038698, Written Opinion dated Oct. 1, 2021", 5 pgs.
"International Application Serial No. PCT US2021 038657, International Search Report dated Oct. 5, 2021", 3 pgs.
"International Application Serial No. PCT US2021 038657, Written Opinion dated Oct. 5, 2021", 4 pgs.
"International Application Serial No. PCT US2021 038669, International Search Report dated Oct. 5, 2021", 4 pgs.
"International Application Serial No. PCT US2021 038669, Written Opinion dated Oct. 5, 2021", 5 pgs.
"International Application Serial No. PCT US2021 038683, International Search Report dated Oct. 5, 2021", 3 pgs.
"International Application Serial No. PCT US2021 038683, Written Opinion dated Oct. 5, 2021", 6 pgs.
"International Application Serial No. PCT US2021 038689, International Search Report dated Oct. 14, 2021", 3 pgs.
"International Application Serial No. PCT US2021 038689, Written Opinion dated Oct. 14, 2021", 5 pgs.

\* cited by examiner

MAPPING HIGH-SPEED, POINT-TO-POINT INTERFACE CHANNELS TO PACKET VIRTUAL CHANNELS

STATEMENT REGARDING GOVERNMENT SUPPORT

This invention was made with U.S. Government support under Agreement No. HR00111830003, awarded by DARPA. The U.S. Government has certain rights in the invention.

TECHNICAL FIELD

Embodiments of the disclosure relate generally to network protocols and more specifically to mapping high-speed, point-to-point interface channels to packet virtual channels.

BACKGROUND

One common high-speed, point-to-point interface, AXI, has five channels used to communicate between devices. The five channels are a read address channel, a read data channel, a write address channel, a write data channel, and a write response channel. The read and write address channels send address and control information. The read and write data channels send data.

Chiplets are an emerging technique for integrating various processing functionality. Generally, a chiplet system is made up of discrete chips (e.g., integrated circuits (ICs) on different substrate or die) that are integrated on an interposer and packaged together. This arrangement is distinct from single chips (e.g., ICs) that contain distinct device blocks (e.g., intellectual property blocks) on one substrate (e.g., single die), such as a system-on-a-chip (SoC), or discretely packaged devices integrated on a board. In general, chiplets provide better performance (e.g., lower power consumption, reduced latency, etc.) than discretely packaged devices, and chiplets provide greater production benefits than single die chips. These production benefits can include higher yields or reduced development costs and time.

Chiplet systems are generally made up of one or more application chiplets and support chiplets. Here, the distinction between application and support chiplets is simply a reference to the likely design scenarios for the chiplet system. Thus, for example, a synthetic vision chiplet system can include an application chiplet to produce the synthetic vision output along with support chiplets, such as a memory controller chiplet, sensor interface chiplet, or communication chiplet. In a typical use case, the synthetic vision designer can design the application chiplet and source the support chiplets from other parties. Thus, the design expenditure (e.g., in terms of time or complexity) is reduced by avoiding the design and production of functionality embodied in the support chiplets. Chiplets also support the tight integration of intellectual property blocks that can otherwise be difficult, such as those using different feature sizes. Thus, for example, devices designed during a previous fabrication generation with larger feature sizes, or those devices in which the feature size is optimized for the power, speed, or heat generation—as can happen with sensors—can be integrated with devices having different feature sizes more easily than attempting to do so on a single die. Additionally, by reducing the overall size of the die, the yield for chiplets tends to be higher than that of more complex, single-die devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Implementations of the present disclosure are directed to systems and methods for mapping from a parallel, synchronous, multi-channel connection with separate read and write channels to packet virtual channels. For purposes of the present description, the techniques will be described in the context of AXI and CPI, but this is by way of example and not limitation. A chip with an AXI interface converts AXI data to a packet format. Information in the AXI channels is multiplexed onto fewer signals and transferred over multiple cycles. The AXI channels are mapped to virtual channels of the packet transmission protocol.

Conversion of AXI channels to a packet format without virtual channels can prevent independent transfer of information in the AXI channels; if packet transfer is stalled because information for one of the AXI channels is flow-controlled at the destination, information for the other AXI channels is also blocked and cannot flow. Thus, by mapping the AXI channels to virtual channels that are independently flow-controlled, any blocking would be on a channel-by-channel basis, allowing some AXI channels to be processed without blocking because another AXI channel is stalled.

Data from multiple AXI channels may be combined in a single packet. For example, an AXI Write Address transaction is combined with its corresponding Write Data transaction into a single packet on virtual channel 0. The virtual channel may be specified in a command field of a header of the packet. Continuing with the mapping of this example embodiment, an AXI Write Response transaction is transferred as a packet using virtual channel 1; an AXI Read Address transaction is transferred as a packet using virtual channel 2; and an AXI Read Data transaction is transferred as a packet using virtual channel 3.

Among the benefits of implementations of the present disclosure is that AXI devices may be connected to a packetized network without losing the advantages of separate channels for different types of communication. This allows existing AXI devices to communicate using a packetized network without internal modification or performance degradation. Other benefits will be evident to those of skill in the relevant art having the benefit of this disclosure.

The particular AXI protocol used for the examples herein is AXI4, but the techniques may apply equally well to AXI3, AXI4-Lite, the AXI coherency extension (ACE), and AXI-Lite.

Figure 1A:
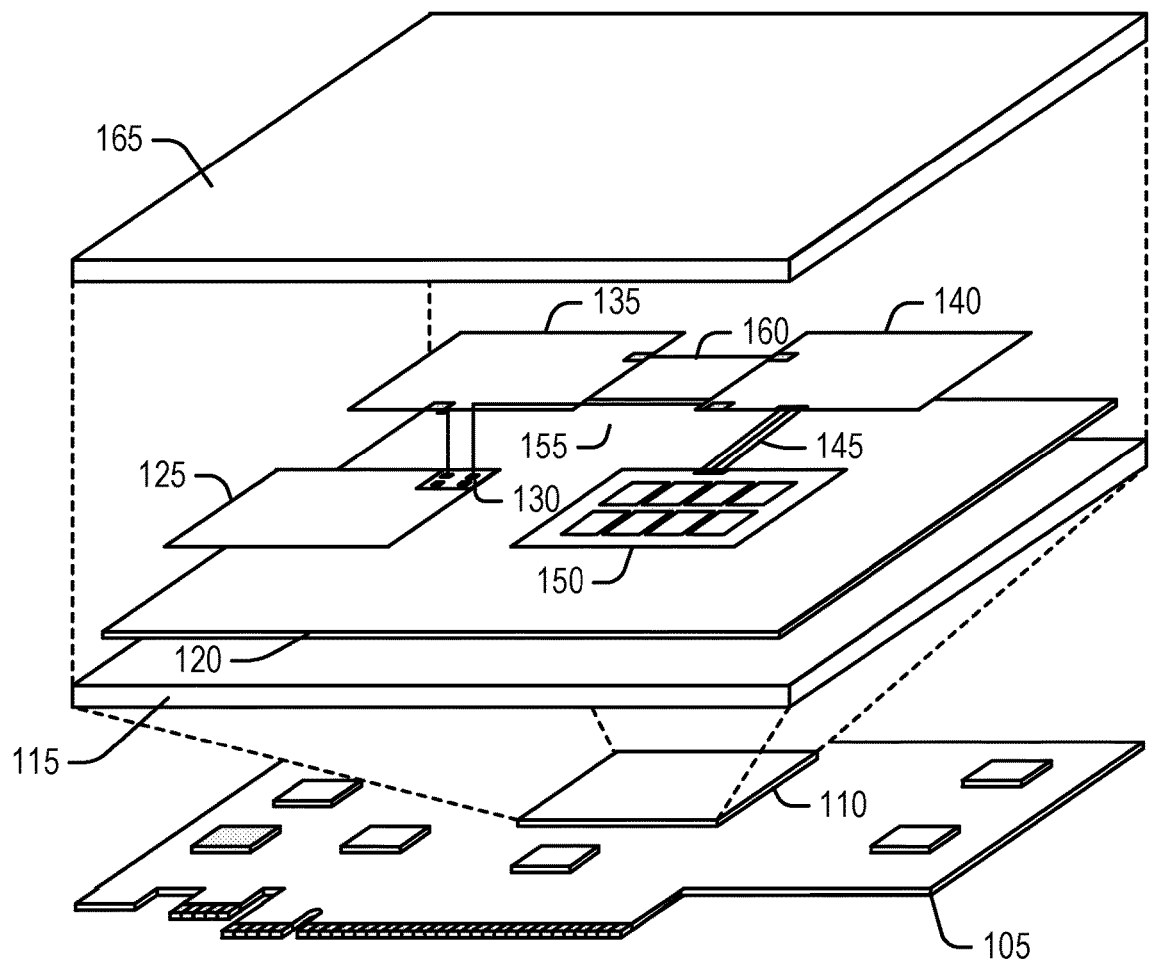
FIGS. 1A and 1B illustrate an example of a chiplet system, according to an embodiment.
Figure 1B:
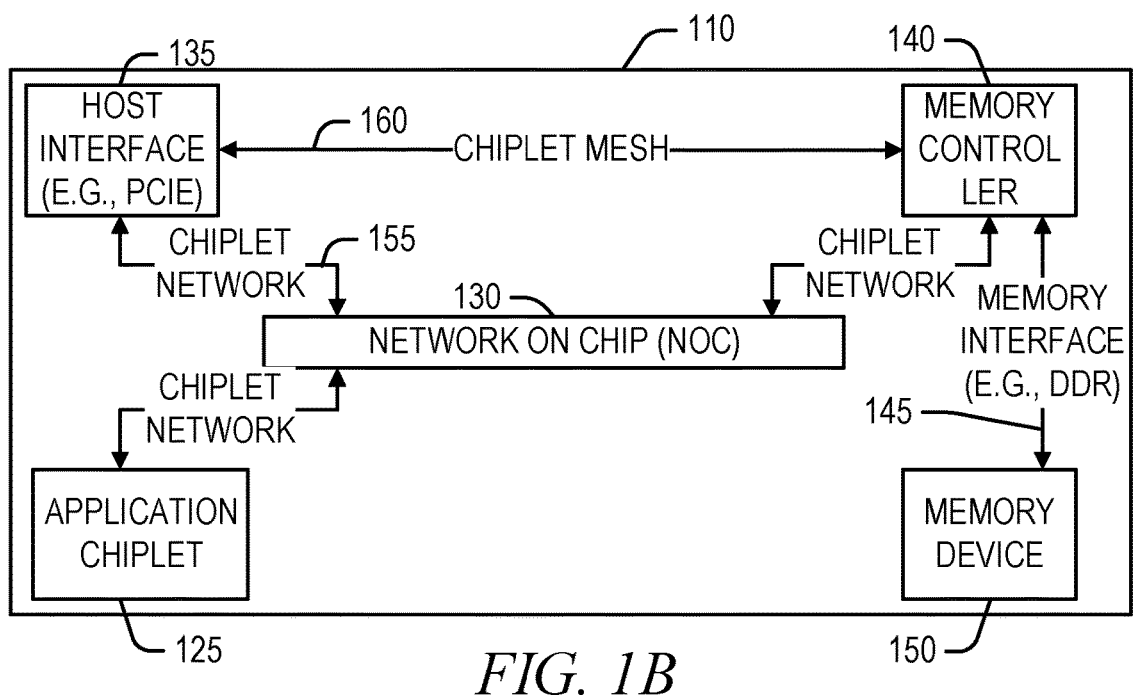

FIGS. 1A and 1B illustrate an example of a chiplet system 110, according to an embodiment. FIG. 1A is a representation of the chiplet system 110 mounted on a peripheral board 105, that can be connected to a broader computer system by a peripheral component interconnect express (PCIe), for example. The chiplet system 110 includes a package substrate 115, an interposer 120, and four chiplets: an application chiplet 125, a host interface chiplet 135, a memory controller chiplet 140, and a memory device chiplet 150. Other systems may include many additional chiplets to provide additional functionalities, as will be apparent from the following discussion. The package of the chiplet system 110 is illustrated with a lid or cover 165, though other packaging techniques and structures for the chiplet system can be used. FIG. 1B is a block diagram labeling the components in the chiplet system 110 for clarity.

The application chiplet 125 is illustrated as including a network-on-chip (NOC) 130 to support a chiplet network 155 for inter-chiplet communications. In example embodiments, NOC 130 may be included on the application chiplet 125. In an example, NOC 130 may be defined in response to selected support chiplets (e.g., chiplets 135, 140, and 150), thus enabling a designer to select an appropriate number of chiplet network connections or switches for the NOC 130. In an example, the NOC 130 can be located on a separate chiplet or even within the interposer 120. In examples as discussed herein, the NOC 130 implements a CPI network.

The CPI is a packet-based network that supports virtual channels to enable a flexible and high-speed interaction between chiplets. CPI enables bridging from intra-chiplet networks to the chiplet network 155. For example, the Advanced eXtensible Interface (AXI) is a widely used specification to design intra-chip communications. AXI specifications, however, cover a great variety of physical design options, such as the number of physical channels, signal timing, power, and so forth. Within a single chip, these options are generally selected to meet design goals, such as power consumption, speed, and so forth. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 155.

CPI can use a variety of different physical layers to transmit packets. The physical layer can include simple conductive connections or drivers to increase the voltage, or otherwise facilitate transmitting the signals over longer distances. An example of one such physical layer can include the Advanced Interface Bus (AIB), which, in various examples, can be implemented in the interposer 120. Though details of the AIB physical layer are described herein, other physical layers may be used with similar or different characteristics. AIB transmits and receives data using source synchronous data transfers with a forwarded clock. Packets are transferred across the AIB at single data rate (SDR) or dual data rate (DDR) with respect to the transmitted clock. Other multiples of the clock rate are also possible.

Various channel widths are supported by AIB and other physical layers. AIB channel widths are in multiples of 20 bits when operated in SDR mode (20, 40, 60, . . . ), and multiples of 40 bits for DDR mode: (40, 80, 120, . . . ). The AIB channel width includes both transmit (TX) and receive (RX) signals. The channel can be configured to have a symmetrical number of TX and RX input/outputs (I/Os), or have a non-symmetrical number of transmitters and receivers (e.g., either all transmitters or all receivers). The chiplet providing the primary clock is the primary chiplet; the other chiplet is the secondary chiplet. In such scenarios, a primary may have independence from other chiplets, and it may have supervisory authority over one or more secondary chiplets. Such a relationship may be similar to the relationship between devices sometimes described using the derogatory and antiquated terms master and slave. AIB I/O cells support three clocking modes: asynchronous (i.e., non-clocked), SDR, and DDR. Other physical layers may support any or all of these clocking modes, or additional clocking modes. In various examples, the non-clocked mode is used for clocks and some control signals. The SDR mode can use dedicated SDR only I/O cells or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half TX and half RX. CPI packet protocols can use an AIB channel in either SDR or DDR operation modes. In an example, the AIB channel is configured in increments of 80 I/O cells (i.e., 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary (AUX) channel. The AUX channel contains signals used for AIB initialization. All AIB channels (other than the AUX channel) within a column are of the same configuration (e.g., all TX, all RX, or half TX and half RX, as well as having the same number of data I/O signals). In an example, AIB channels are numbered in continuous increasing order starting with the MB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach chiplet-to-chiplet interconnects, a parallel interface with clock rates that allow data transfer with minimal latency may be utilized. CPI includes elements to minimize both latency and energy consumption in these ultra-short reach chiplet interconnects.

For flow control, CPI employs a credit-based technique. A recipient, such as the application chiplet 125, provides a sender, such as the memory controller chiplet 140, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender to allow transmitting of additional information.

Also illustrated is a chiplet mesh network 160 that uses a direct, chiplet-to-chiplet technique without the need for the NOC 130. The chiplet mesh network 160 can be implemented in CPI or another chiplet-to-chiplet protocol. The chiplet mesh network 160 generally enables a pipeline of chiplets where one chiplet serves as the interface to the pipeline while other chiplets in the pipeline interface only with themselves.

Additionally, dedicated device interfaces, such as one or more industry standard memory interfaces 145 (such as, for example, synchronous memory interfaces, such as DDR5, DDR6), can also be used to interconnect chiplets. Connection of a chiplet system or individual chiplets to external devices (such as a larger system) can be through a desired interface (for example, a PCIE interface). Such an external interface may be implemented, in an example, through a host interface chiplet 135, which in the depicted example provides a PCIE interface external to chiplet system 110. Such dedicated interfaces 145 are generally employed when a convention or standard in the industry has converged on such an interface. The illustrated example of a DDR interface 145 connecting the memory controller chiplet 140 to a dynamic random access memory (DRAM) memory device chiplet 150 is just such an industry convention.

Of the variety of possible support chiplets, the memory controller chiplet 140 is likely present in the chiplet system 110 due to the near omnipresent use of storage for computer processing as well as being sophisticated state-of-the-art for memory devices. Thus, using memory device chiplets 150 and memory controller chiplets 140 produced by others gives chiplet system designers access to robust products by sophisticated producers. Generally, the memory controller chiplet 140 provides a memory device-specific interface to read, write, or erase data. Often, the memory controller chiplet 140 can provide additional features, such as error detection, error correction, maintenance operations, or atomic operation execution. For some types of memory, maintenance operations tend to be specific to the memory device chiplet 150, such as garbage collection in negative-and (NAND) flash or storage class memories and temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh, may be controlled by a host processor or a memory controller at some times, and at other times be controlled by the DRAM memory device or by logic associated with one or more DRAM devices, such as an interface chip (in an example, a buffer).

Atomic operations are a data manipulation that, for example, may be performed by the memory controller chiplet 140. In other chiplet systems, the atomic operations may be performed by other chiplets. For example, an atomic operation of "increment" can be specified in a command by the application chiplet 125, with the command including a memory address and possibly an increment value. Upon receiving the command, the memory controller chiplet 140 retrieves a number from the specified memory address, increments the number by the amount specified in the command, and stores the result. Upon a successful completion, the memory controller chiplet 140 provides an indication of the command's success to the application chiplet 125. Atomic operations avoid transmitting the data across the chiplet mesh network 160, resulting in lower latency execution of such commands.

Atomic operations can be classified as built-in atomics or programmable (e.g., custom) atomics. Built-in atomics are a finite set of operations that are immutably implemented in hardware. Programmable atomics are small programs that can run on a programmable atomic unit (PAU) (e.g., a custom atomic unit (CAU)) of the memory controller chiplet 140. FIG. 1 illustrates an example of a memory controller chiplet that comprises a PAU.

The memory device chiplet 150 can be, or include any combination of, volatile memory devices or non-volatile memories. Examples of volatile memory devices include, but are not limited to, random access memory (RAM)—such as DRAM) synchronous DRAM (SDRAM), and graphics double data rate type 6 SDRAM (GDDR6 SDRAM), among others. Examples of non-volatile memory devices include, but are not limited to, NAND-type flash memory, storage class memory (e.g., phase-change memory or memristor-based technologies), and ferroelectric RAM (FeRAM), among others. The illustrated example includes the memory device as the memory device chiplet 150; however, the memory device can reside elsewhere, such as in a different package on the board 105. For many applications, multiple memory device chiplets may be provided. In an example, these memory device chiplets may each implement one or multiple storage technologies. In an example, a memory chiplet may include multiple stacked memory die of different technologies (for example, one or more SRAM devices stacked or otherwise in communication with one or more DRAM devices). Memory controller chiplet 140 may also serve to coordinate operations between multiple memory chiplets in chiplet system 110 (for example, to utilize one or more memory chiplets in one or more levels of cache storage and to use one or more additional memory chiplets as main memory). Chiplet system 110 may also include multiple memory controller chiplets 140, as may be used to provide memory control functionality for separate processors, sensors, networks, and so forth. A chiplet architecture, such as chiplet system 110, offers advantages in allowing adaptation to different memory storage technologies and different memory interfaces, through updated chiplet configurations, without requiring redesign of the remainder of the system structure.

Figure 2:
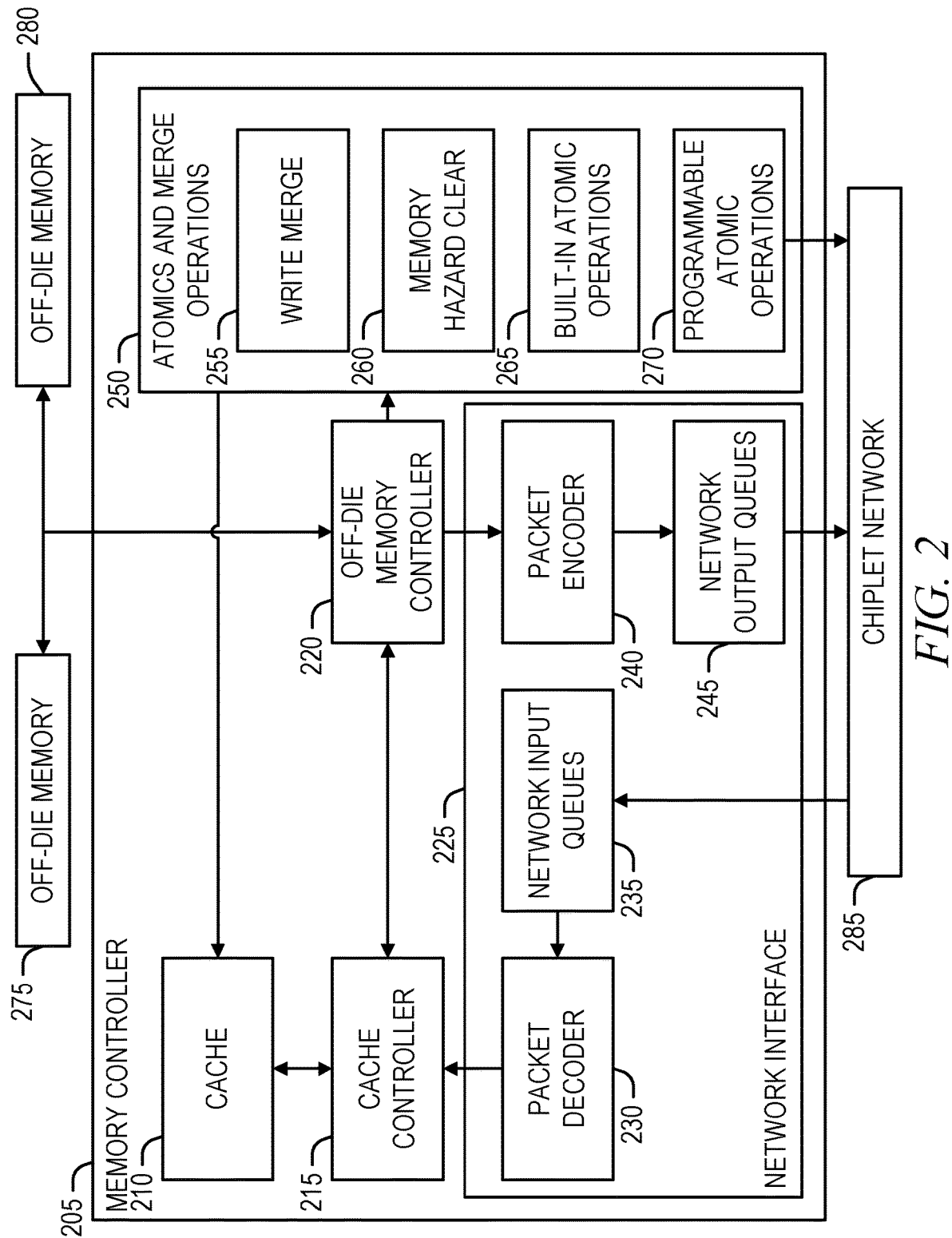
FIG. 2 illustrates components of an example of a memory controller chiplet, according to an embodiment.

FIG. 2 illustrates components of an example of a memory controller chiplet 205, according to an embodiment. The memory controller chiplet 205 includes a cache 210, a cache controller 215, an off-die memory controller 220 (e.g., to communicate with off-die memory 275), a network communication interface 225 (e.g., to interface with a chiplet network 285 and communicate with other chiplets), and a set of atomic and merge operations units 250. Members of this set can include, for example, a write merge unit 255, a hazard clear unit 260, built-in atomic operations unit 265, or a PAU 270. The various components are illustrated logically and not as they necessarily would be implemented. For example, the built-in atomic operations unit 265 likely comprises different devices along a path to the off-die memory. For example, the built-in atomic operations unit 265 could be in an interface device/buffer on a memory chiplet, as discussed above. In contrast, the PAU 270 are likely implemented in a separate processor on the memory controller chiplet 205 (but in various examples may be implemented in other locations, for example on a memory chiplet).

The off-die memory controller 220 is directly coupled to an off-die memory 275 (e.g., via a bus or other communication connection) to provide write operations and read operations to and from the one or more off-die memory, such as off-die memory 275 and off-die memory 280. In the depicted example, the off-die memory controller 220 is also coupled for output to the atomic and merge operations units 250 and for input to the cache controller 215 (e.g., a memory-side cache controller).

In the example configuration, cache controller 215 is directly coupled to the cache 210, and may be coupled to the network communication interface 225 for input (such as incoming read or write requests) and coupled for output to the off-die memory controller 220.

The network communication interface 225 includes a packet decoder 230, network input queues 235, a packet encoder 240, and network output queues 245 to support a packet-based chiplet network 285, such as CPI. The chiplet network 285 can provide packet routing between and among processors, memory controllers, hybrid threading processors, configurable processing circuits, or communication interfaces. In such a packet-based communication system, each packet typically includes destination and source addressing, along with any data payload or instruction. In an example, the chiplet network 285 can be implemented as a collection of crossbar switches having a folded Clos configuration or a mesh network providing for additional connections, depending upon the configuration.

In various examples, the chiplet network 285 can be part of an asynchronous switching fabric. Here, a data packet can be routed along any of various paths, such that the arrival of any selected data packet at an addressed destination can occur at any of multiple different times, depending upon the routing. Additionally, chiplet network 285 can be implemented at least in part as a synchronous communication network, such as a synchronous mesh communication network. Both configurations of communication networks are contemplated for use for examples in accordance with the present disclosure.

The memory controller chiplet 205 can receive a packet having, for example, a source address, a read request, and a physical address. In response, the off-die memory controller 220 or the cache controller 215 will read the data from the specified physical address (which can be in the off-die memory 275 or in the cache 210), and assemble a response packet to the source address containing the requested data. Similarly, the memory controller chiplet 205 can receive a packet having a source address, a write request, and a physical address. In response, the memory controller chiplet 205 will write the data to the specified physical address (which can be in the cache 210 or in the off-die memories 275 or 280), and assemble a response packet to the source address containing an acknowledgement that the data was stored to a memory.

Thus, the memory controller chiplet 205 can receive read and write requests via the chiplet network 285 and process the requests using the cache controller 215 interfacing with the cache 210, if possible. If the request cannot be handled by the cache controller 215, the off-die memory controller 220 handles the request by communication with the off-die memories 275 or 280, the atomic and merge operations units 250, or both. As noted above, one or more levels of cache may also be implemented in off-die memories 275 or 280, and in some such examples may be accessed directly by cache controller 215. Data read by the off-die memory controller 220 can be cached in the cache 210 by the cache controller 215 for later use.

The atomics and merge operations units 250 are coupled to receive (as input) the output of the off-die memory controller 220, and to provide output to the cache 210, the network communication interface 225, or directly to the chiplet network 285. The memory hazard clear (reset) unit 260, write merge unit 255, and the built-in (e.g., predetermined) atomic operations unit 265 can each be implemented as state machines with other combinational logic circuitry (such as adders, shifters, comparators, AND gates, OR gates, XOR gates, or any suitable combination thereof) or other logic circuitry. These components can also include one or more registers or buffers to store operand or other data. The PAU 270 can be implemented as one or more processor cores or control circuitry and various state machines with other combinational logic circuitry or other logic circuitry, and can also include one or more registers, buffers, or memories to store addresses, executable instructions, operand and other data, or can be implemented as a processor.

The write merge unit 255 receives read data and request data and merges the request data and read data to create a single unit having the read data and the source address to be used in the response or return data packet. The write merge unit 255 provides the merged data to the write port of the cache 210 (or, equivalently, to the cache controller 215 to write to the cache 210). Optionally, the write merge unit 255 provides the merged data to the network communication interface 225 to encode and prepare a response or return data packet for transmission on the chiplet network 285.

When the request data is for a built-in atomic operation, the built-in atomic operations unit 265 receives the request and reads data, either from the write merge unit 255 or directly from the off-die memory controller 220. The atomic operation is performed, and using the write merge unit 255, the resulting data is written to the cache 210, or provided to the network communication interface 225 to encode and prepare a response or return data packet for transmission on the chiplet network 285.

The built-in atomic operations unit 265 handles predefined atomic operations such as fetch-and-increment or compare-and-swap. In an example, these operations perform a simple read-modify-write operation to a single memory location of 32-bytes or less in size. Atomic memory operations are initiated from a request packet transmitted over the chiplet network 285. The request packet has a physical address, atomic operator type, operand size, and, optionally, up to 32-bytes of data. The atomic operation performs the read-modify-write to a cache memory line of the cache 210, filling the cache memory if necessary. The atomic operator response can be a simple completion response or a response with up to 32-bytes of data. Example atomic memory operators include fetch-and-AND, fetch-and-OR, fetch-and-XOR, fetch-and-add, fetch-and-subtract, fetch-and-increment, fetch-and-decrement, fetch-and-minimum, fetch-and-maximum, fetch-and-swap, and compare-and-swap. In various example embodiments, 32-bit and 64-bit operations are supported, along with operations on 16 or 32 bytes of data. Methods disclosed herein are also compatible with hardware supporting larger or smaller operations and more or less data.

Built-in atomic operations can also involve requests for a "standard" atomic operation on the requested data, such as comparatively simple, single cycle, integer atomics, such as fetch-and-increment or compare-and-swap, which will occur with the same throughput as a regular memory read or write operation not involving an atomic operation. For these operations, the cache controller 215 may generally reserve a cache line in the cache 210 by setting a hazard bit (in hardware), so that the cache line cannot be read by another process while it is in transition. The data is obtained from either the off-die memory 275 or the cache 210, and is provided to the built-in atomic operations unit 265 to perform the requested atomic operation. Following the atomic operation, in addition to providing the resulting data to the data packet encoder 240 to encode outgoing data packets for transmission on the chiplet network 285, the built-in atomic operations unit 265 provides the resulting data to the write merge unit 255, which will also write the resulting data to the cache 210. Following the writing of the resulting data to the cache 210, any corresponding hazard bit which was set will be cleared by the memory hazard clear unit 260.

The PAU 270 enables high performance (high throughput and low latency) for programmable atomic operations (also referred to as "custom atomic operations"), comparable to the performance of built-in atomic operations. Rather than executing multiple memory accesses, in response to an atomic operation request designating a programmable atomic operation and a memory address, circuitry in the memory controller chiplet 205 transfers the atomic operation request to PAU 270 and sets a hazard bit stored in a memory hazard register corresponding to the memory address of the memory line used in the atomic operation to ensure that no other operation (read, write, or atomic) is performed on that memory line, which hazard bit is then cleared upon completion of the atomic operation. Additional direct data paths provided for the PAU 270 executing the programmable atomic operations allow for additional write operations without any limitations imposed by the bandwidth of the communication networks and without increasing any congestion of the communication networks.

The PAU 270 includes a multi-threaded processor, for example, such as a RISC-V ISA based multi-threaded processor, having one or more processor cores, and further having an extended instruction set for executing programmable atomic operations. When provided with the extended instruction set for executing programmable atomic operations, the PAU 270 can be embodied as one or more hybrid threading processors. In some example embodiments, the PAU 270 provides barrel-style, round-robin instantaneous thread switching to maintain a high instruction-per-clock rate.

Programmable atomic operations can be performed by the PAU 270 involving requests for a programmable atomic operation on the requested data. A user can prepare programming code to provide such programmable atomic operations. For example, the programmable atomic operations can be comparatively simple, multi-cycle operations such as floating-point addition, or comparatively complex, multi-instruction operations such as a Bloom filter insert. The programmable atomic operations can be the same as or different than the predetermined atomic operations, insofar as they are defined by the user rather than a system vendor. For these operations, the cache controller 215 can reserve a cache line in the cache 210, by setting a hazard bit (in hardware), so that cache line cannot be read by another process while it is in transition. The data is obtained from either the cache 210 or the off-die memories 275 or 280, and is provided to the PAU 270 to perform the requested programmable atomic operation. Following the atomic operation, the PAU 270 will provide the resulting data to the network communication interface 225 to directly encode outgoing data packets having the resulting data for transmission on the chiplet network 285. In addition, the PAU 270 will provide the resulting data to the cache controller 215, which will also write the resulting data to the cache 210. Following the writing of the resulting data to the cache 210, any corresponding hazard bit which was set will be cleared by the cache controller 215.

In selected examples, the approach taken for programmable atomic operations is to provide multiple custom atomic request types that can be sent through the chiplet network 285 to the memory controller chiplet 205 from an originating source such as a processor or other system component. The cache controllers 215 or off-die memory controller 220 identify the request as a custom atomic and forward the request to the PAU 270. In a representative embodiment, the PAU 270: (1) is a programmable processing element capable of efficiently performing a user-defined atomic operation; (2) can perform load and stores to memory, arithmetic and logical operations, and control flow decisions; and (3) leverages the RISC-V ISA with a set of new, specialized instructions to facilitate interacting with such controllers 215, 220 to atomically perform the user-defined operation. In desirable examples, the RISC-V ISA contains a full set of instructions that support high-level language operators and data types. The PAU 270 can leverage the RISC-V ISA, but will commonly support a more limited set of instructions and limited register file size to reduce the die size of the unit when included within the memory controller chiplet 205.

As mentioned above, prior to the writing of the read data to the cache 210, the set hazard bit for the reserved cache line is to be cleared by the memory hazard clear unit 260. Accordingly, when the request and read data is received by the write merge unit 255, a reset or clear signal can be transmitted by the memory hazard clear unit 260 to the cache 210 to reset the set memory hazard bit for the reserved cache line. Also, resetting this hazard bit will release a pending read or write request involving the designated (or reserved) cache line, providing the pending read or write request to an inbound request multiplexer for selection and processing.

Figure 3:
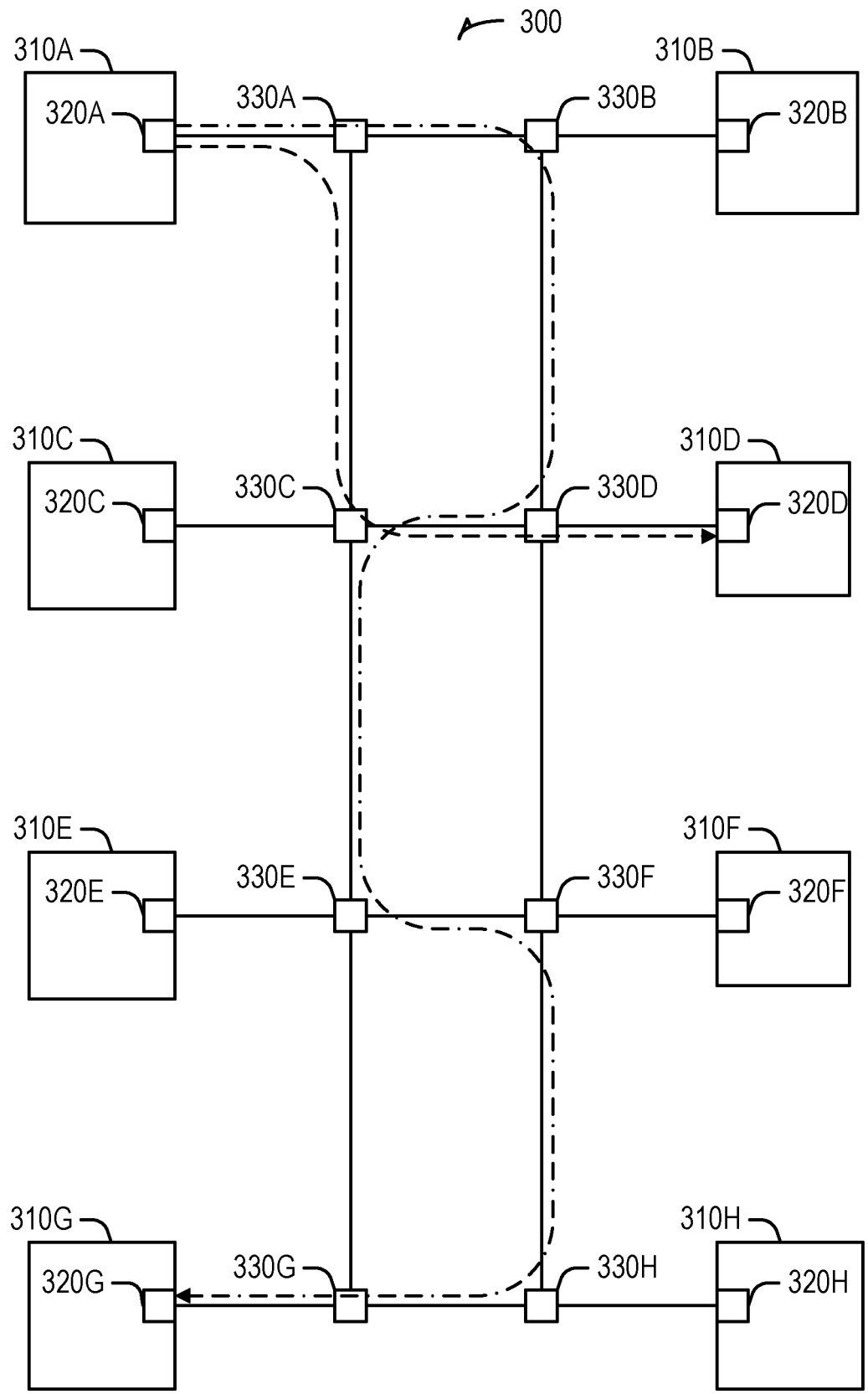
FIG. 3 illustrates an example of routing between chiplets using a chiplet protocol interface (CPI) network, according to an embodiment.

FIG. 3 illustrates an example of routing between chiplets in a chiplet layout 300 using a CPI network, according to an embodiment. The chiplet layout 300 includes chiplets 310A, 310B, 310C, 310D, 310E, 310F, 310G, and 310H. The chiplets 310A-310H are interconnected by a network comprising nodes 330A, 330B, 330C, 330D, 330E, 330F, 330G, and 330H. Each of the chiplets 310A-310H includes a hardware transceiver, labeled 320A-320H.

CPI packets can be transferred between the chiplets 310 using an AIB. The AIB provides physical layer functionality. The physical layer transmits and receives data using source synchronous data transfers with a forwarded clock. Packets are transferred across the AIB at SDR or DDR with respect to the transmitted clock. Various channel widths are supported by the AIB. AIB channel widths are in multiples of 20 bits when operated in SDR mode (20, 40, 60, . . . ), and 40 bits for DDR mode (40, 80, 120, . . . ). The AIB channel width includes both TX and RX signals. The channel may be configured to have a symmetrical number of TX and RX (I/Os or have a non-symmetrical number of transmitters and receivers (e.g., either all transmitters or all receivers). The channel may act as an AIB primary or secondary depending on which chiplet provides the primary clock.

The AIB adapter provides an interface to the AIB link layer and an interface to the AIB physical layer (PHY). The AIB adapter provides data staging registers, power-on reset sequencers, and a control signal shift register.

The AIB physical layer consists of AIB I/O cells. AIB I/O cells (implemented, in some example embodiments, by the hardware transceivers 320) may be input only, output only, or bidirectional. An AIB channel is composed of a set of AIB I/O cells and the number of cells is dependent on the configuration of the AIB channel. The receive signals on one chiplet are connected to the transmit signals on the paired chiplet. In some example embodiments, each column comprises an AUX channel and data channels numbered 0 to N.

AIB channels are typically configured as half TX data plus half RX data, all TX data, or all RX data plus associated clocks and miscellaneous control. The number of TX versus RX data signals is determined at design time and cannot be configured as part of system initialization, in some example embodiments.

The CPI packet protocols (point-to-point and routable) use symmetrical receive and transmit I/O cells within an AIB channel. The CPI streaming protocol allows more flexible use of the AIB I/O cells. An AIB channel for streaming mode may configure the I/O cells as all TX, all RX, or half TX and half RX, in some example embodiments.

Data packets are routed among the chiplets 310 by the network nodes 330. A node 330 may determine the next node 330 to forward a received data packet to based on one or more data fields of the data packet. For example, a source or destination address, source or destination port, virtual channel, or any suitable combination thereof may be hashed to select a successive network node or an available network path. Selecting paths in this way may serve to balance network traffic.

Thus, in FIG. 3, a data path is shown from the chiplet 310A to the chiplet 310D. The data packet is sent by the hardware transceiver 320A to the network node 330A; forwarded by the network node 330A to the network node 330C; forwarded by the network node 330C to the network node 330D; and delivered by the network node 330D to the hardware transceiver 320D of the chiplet 310D.

A second data path is also shown in FIG. 3, from the chiplet 310A to the chiplet 310G. The data packet is sent by the hardware transceiver 320A to the network node 330A; forwarded by the network node 330A to the network node 330B; forwarded by the network node 330B to the network node 330D; forwarded by the network node 330D to the network node 330C; forwarded by the network node 330C to the network node 330E; forwarded by the network node 330E to the network node 330F; forwarded by the network node 330F to the network node 330H; forwarded by the network node 330H to the network node 330G; and delivered by the network node 330G to the hardware transceiver 320G of the chiplet 310G. As is visually apparent in FIG. 3, multiple paths through the network are available for transmission of data between any pair of chiplets.

AIB I/O cells support three clocking modes: asynchronous (i.e., non-clocked), SDR, and DDR. The non-clocked mode is used for clocks and some control signals. The SDR mode may use dedicated SDR only I/O cells or dual use SDR/DDR I/O cells.

CPI packet protocols (point-to-point and routable) may use an AIB channel in either SDR or DDR operation modes. In some example embodiments, the AIB channel is in increments of 80 I/O cells (i.e., 40 TX and 40 RX) for SDR mode and 40 I/O cells for DDR mode.

CPI streaming protocol may use an AIB channel in either SDR or DDR operation modes. In some example embodiments, for both modes (SDR and DDR), the AIB channel is in increments of 40 I/O cells.

Each AIB channel is assigned a unique interface identifier. The identifier is used during CPI reset and initialization to determine paired AIB channels across adjacent chiplets. In some example embodiments, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

In some example embodiments, AIB channels are numbered in continuous increasing order starting with the AIB channel adjacent to the AUX channel. The AIB channel adjacent to the AUX is defined to be AIB channel zero.

FIG. 3, by way of example, shows eight chiplets 310 connected by a network comprising eight nodes 330. More or fewer chiplets 310 and more or fewer nodes 330 may be included in the chiplet network, allowing a network of chiplets of arbitrary size to be created.

Figure 4:
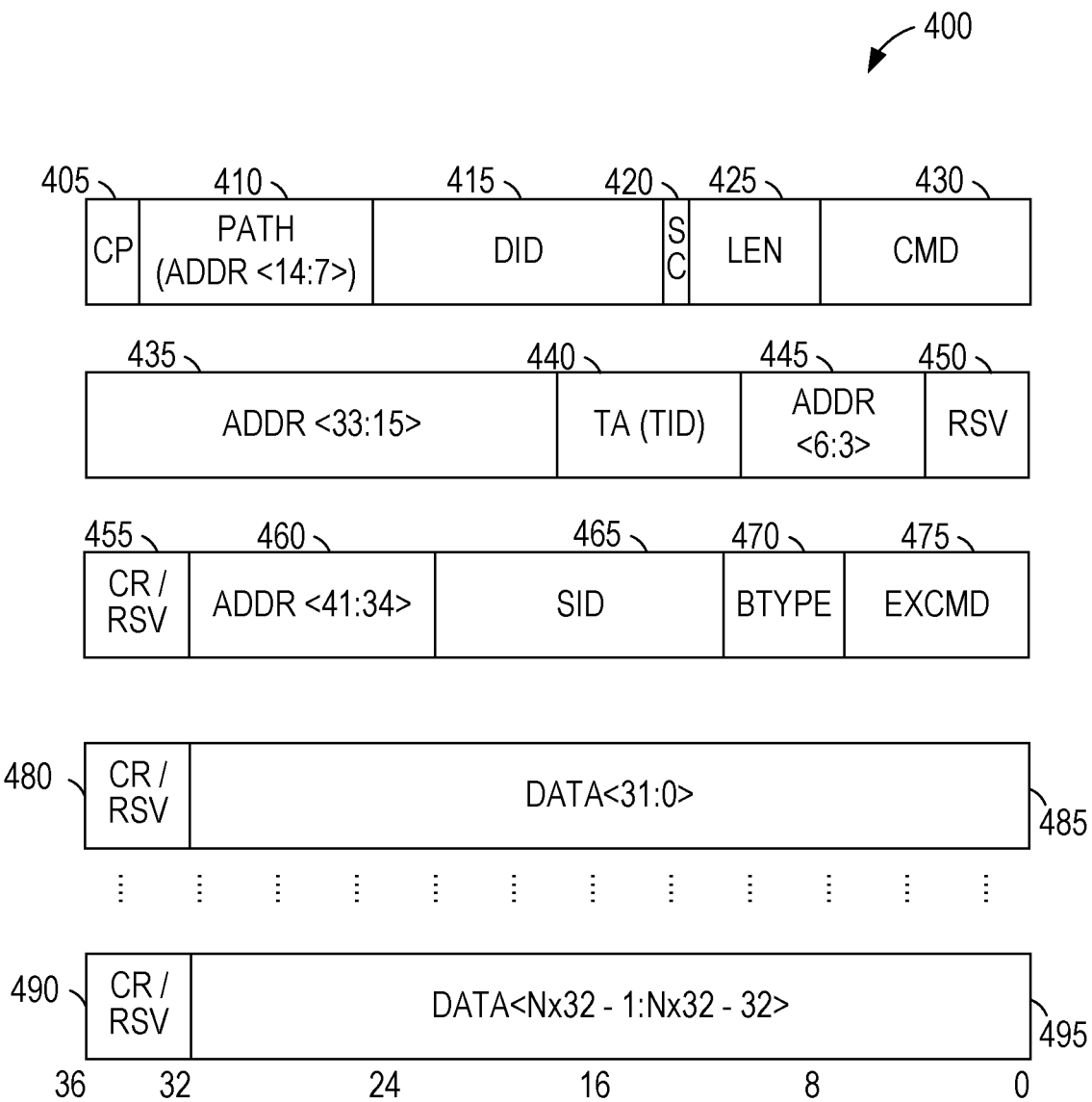
FIG. 4 is a block diagram of a data packet comprising multiple flow control units (flits), in accordance with some embodiments of the present disclosure.

FIG. 4 is a block diagram of a data packet 400 comprising multiple flits, in accordance with some embodiments of the present disclosure. The data packet 400 is divided into flow control units (flits), each of which is composed of 36 bits. The first flit of the data packet 400 includes control path field 405, path field 410, destination identifier (DID) field 415, sequence continue (SC) field 420, length field 425, and command field 430. The second flit includes address fields 435 and 445, a transaction ID (TID) field 440, and reserved (RSV) field 450. The third flit includes credit return (CR)/RSV field 455, address field 460, source identifier (SID) 465, bridge type (BTYPE) 470, and extended command (EXCMD) 475. Each remaining flit includes a CR/RSV field (e.g., the CR/RSV fields 480 and 490) and a data field (e.g., the data fields 485 and 495).

The control path field 405 is a two-bit field that indicates whether the CR/RSV field of later flits in the packet contain CR data, RSV data, or should be ignored, and whether the path field 410 should be used to control ordering of packets. In some example embodiments, a value of 0 or 1 in the control path field 405 indicates that the CR/RSV fields 455, 480, 490 contain credit return data; a value of 2 or 3 in the control path field 405 indicates that the CR/RSV fields 455, 480, 490 contain RSV data; a value of 0 indicates that the path field 410 is ignored; a value of 1 or 3 indicates that the path field 410 is used to determine the path for the data packet 400; and a value of 2 indicates that single path ordering is to be used. In some example embodiments a 1-bit field is used. Alternatively, the high bit of the control path field 405 may be considered to be a 1-bit field that controls whether the CR/RSV fields 450, 455 contain credit return data or RSV data.

The path field 410 is an eight-bit field. When the control path field 405 indicates that the path field 410 is used to determine the path for a data packet 400, all data packets having the same value for the path field 410 are guaranteed to take the same path through the network. As a result, the order of the data packets will be unchanged between the sender and the receiver. If the control path field 405 indicates that single path ordering is to be used, the path is determined for each packet as though the path field 410 were set to zero. Accordingly, all packets take the same path and the order will be unchanged, regardless of the actual value of the path field 410 of each data packet. If the control path field 405 indicates that the path field 410 is to be ignored, the data packets are routed without regard to the value of the path field 410 and the data packets may be received by the receiver in a different order than they were sent by the sender. However, this may avoid congestion in the network and allow for greater throughput in the device.

The DID field 415 stores a twelve-bit DID. The DID uniquely identifies a destination in the network (e.g., a destination chiplet). A sequence of data packets all having the SC field 420 set are guaranteed to be delivered in order. The length field 425 is a five-bit field that indicates the number of flits that comprise the data packet 400. Interpretation of the length field 425 may be non-linear. For example, values 0-22 may be interpreted as 0-22 flits in the data packet 400 and values 23-27 may be interpreted as 33-37 flits in the data packet 400 (i.e., 10 more than the indicated value). Other values of the length field 425 may be vendor defined instead of protocol defined.

The command for the data packet 400 is stored in the command field 430, a seven-bit field. The command may be a write command, a read command, a predefined atomic operation command, a custom atomic operation command, a read response, an acknowledge response, or a vendor-specific command. Additionally, the command may indicate a virtual channel of the data packet 400. For example, different commands may be used for different virtual channels, or 1, 2, 3, or 4 bits of the seven-bit command field 430 may be used to indicate the virtual channel and the remaining bits may be used to indicate the command. The table below shows the virtual channel based on the protocol, and the command is below, according to some example embodiments.

| Virtual Channel | CPI Protocol | AXI Protocol |
| --- | --- | --- |
| 0 | Read/Write Requests | Write Requests |
| 1 | Read/Write Responses | Write Responses |

-continued

| Virtual Channel | CPI Protocol | AXI Protocol |
| --- | --- | --- |
| 2 | Unused | Read Requests |
| 3 | Unused | Read Responses |

An address for the command may be indicated in the path field 410, the address fields 435, 445, and 460, or any suitable combination thereof. For example, the high 38 bits of a 4-byte aligned 41-bit address may be indicated by concatenating the address field 460, the address field 435, the path field 410, and the address field 445 in order (high bits first). The TID field 440 is used to match responses to requests. For example, if a first packet 400 is a read request that identifies a memory location to read, a responsive second packet 400 containing the read data will include the same value in the TID field 440.

The SID field 465 identifies the source of the data packet 400. Accordingly, the recipient of the packet 400 can send a responsive packet by copying the value in the SID field 465 into the DID field 415 of the responsive packet. The 4-bit BTYPE field 470 specifies the command set that is used for the packet 400. A BTYPE of 0 indicates a first method to determine the command of the packet 400 (e.g., a command determined based on the CPI protocol and the command field 430). A BTYPE of 1 indicates a second method to determine the command of the packet 400 (e.g., a command based on the AXI protocol and the EXCMD field 475). Other BTYPE values indicate still other methods of determining the command of the packet 400. Thus, instead of encapsulating a packet of a second protocol entirely within the data fields of the data packet 400 for transmission over a network using a first protocol, the much lower overhead of adding one or two flits that identify the protocol of the packet 400 allows the network to support both protocols (in this example, CPI and AXI).

The memory access commands may identify a number of bytes to be written or accessed, a memory space to access (e.g., the off-die memory 275 or an instruction memory for custom atomic operations), or any suitable combination thereof. In some example embodiments, the command may indicate that additional bits of a later flit identify the command. For example, a multi-byte command could be sent by using a vendor-specific command in the seven-bit command field 430 and using a portion or all of the 7-bit extended command (EXCMD) field 475 to contain the larger command. Thus, for certain values of the command field 430, the packet 400 includes only one header flit (e.g., the first header flit shown in FIG. 4, containing fields 405-430). For other values of the command field 430, the packet 400 includes a predetermined additional number of header flits (e.g., two additional header flits as shown in FIG. 4, containing fields 435-475) or a predetermined total number of header flits (e.g., three total header flits as shown in FIG. 4, containing fields 405-475).

If CR is enabled, two bits of the CR/RSV field 455, 480, 490 identify whether the credit return is for virtual channel 0, 1, 2, or 3 and the other two bits of the CR/RSV field 455, 480, 490 indicate whether the number of credits to be returned is 0, 1, 2, or 3.

Figure 5:
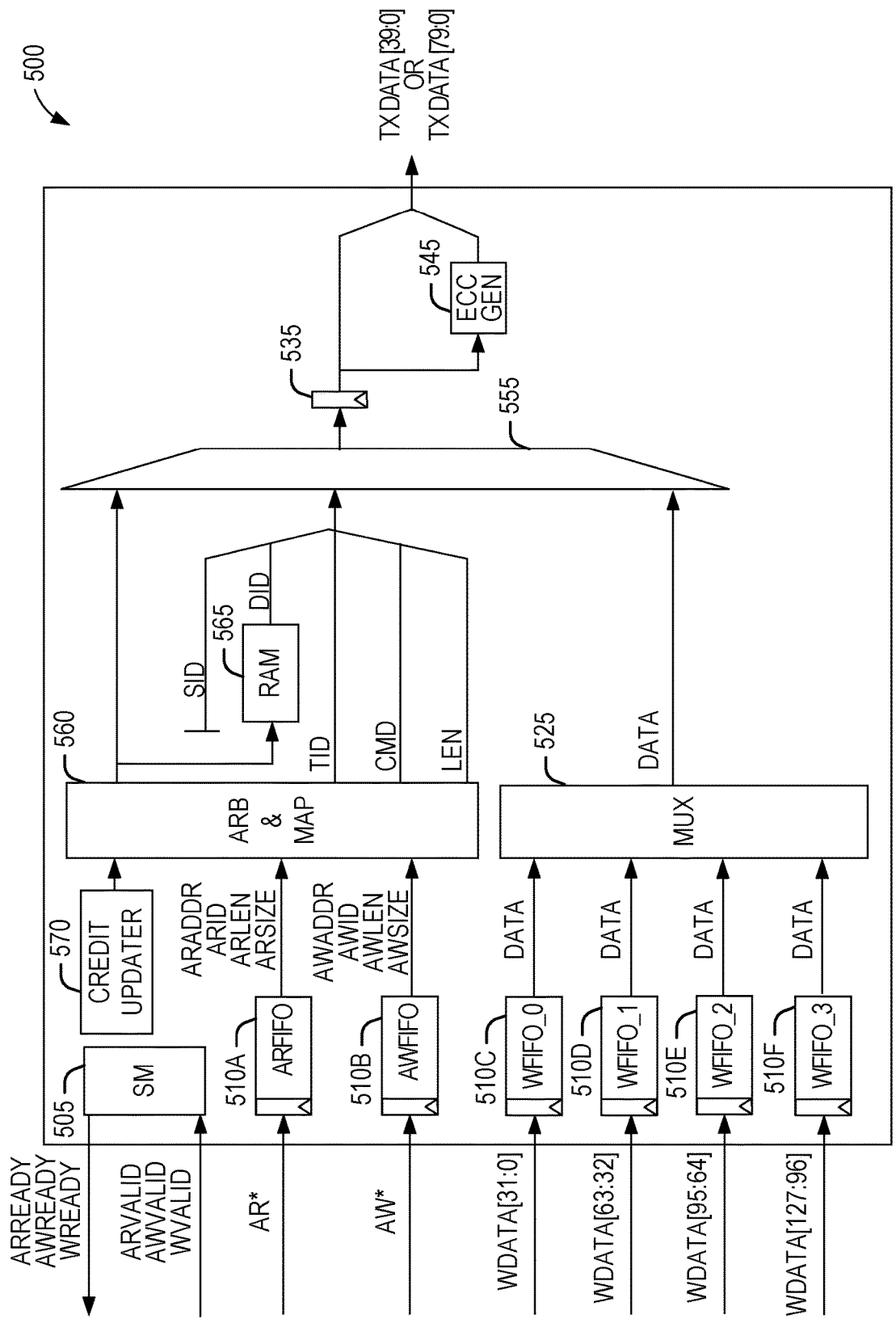
FIG. 5 is a block diagram of a circuit that converts signals from an AXI primary to CPI packets, in accordance with some embodiments of the present disclosure.

FIG. 5 is a block diagram of a circuit 500 that converts signals from an AXI primary to CPI packets, in accordance with some embodiments of the present disclosure. The circuit 500 includes a state machine 505; first in first out (FIFO) buffers (also referred to as FIFOs) 510A, 510B, 510C, 510D, 510E, and 510F; register 535; multiplexers (MUXes) 525 and 555; error correction code (ECC) generator 545; arbitrator 560; memory 565; and credit updater 570. The components of the circuit 500 are connected via hardware traces, buses, or other physical connections.

The left side of the circuit 500 is connected to an AXI primary device. The right side of the circuit 500 is connected to a CPI network. The circuit 500 receives read address, write address, and write data commands from the AXI primary device and provides corresponding CPI packets to the CPI network.

The state machine 505 provides ARREADY, AWREADY, and WREADY signals to the AXI primary. Each signal indicates, if raised, that the circuit 500 is ready to receive a corresponding input. The ARREADY signal, if raised, indicates that the circuit 500 is ready to receive a read address. The AWREADY signal, if raised, indicates that the circuit 500 is ready to receive a write address. The WREADY signal, if raised, indicates that the circuit 500 is ready to receive write data.

The AXI primary provides ARVALID, AWVALID, and WVALID signals to the state machine 505, each of which may be raised to indicate that a corresponding input is valid or lowered to indicate that the corresponding input is not valid. The ARVALID signal, when raised, indicates that the AXI primary is providing a valid read address to the FIFO 510A. The AWVALID signal, when raised, indicates that the AXI primary is providing a valid write address to the FIFO 510B. The WVALID signal, when raised, indicates that the AXI primary is providing valid write data to one or more of the FIFOs 510C-510F.

Thus, when both the ARREADY and ARVALID signals are raised, the circuit 500 processes the read address input by the AXI primary to the read address FIFO 510A. Similarly, when both the AWREADY and AWVALID signals are raised, the circuit 500 processes the write address input by the AXI primary to the write address FIFO 510B. The read or write address is provided to the arbitrator 560, which generates a corresponding CPI packet.

For a read command, only an address is needed (not data). The arbitrator 560 verifies with the credit updater 570 that sufficient credits are available on a virtual channel corresponding to a read command (e.g., virtual channel 2) and updates the available credits for the virtual channel. Each field of the CPI packet is either provided by the AXI primary (e.g., the address), statically defined by the circuit 500 (e.g., the source identifier), dynamically defined by the circuit 500 based on the AXI signals (e.g., by looking up a destination ID in the memory 565 based on the address provided by the AXI primary or by determining a length of a packet based on the command and data provided by the AXI primary), or dynamically defined by the circuit 500 based on state of the circuit 500 (e.g., selecting an available transaction ID). The CPI packet is provided to the MUX 555 and held in the register 535 for access by the ECC generator 545. The generated CPI packet is provided to the CPI network.

Unlike a read command, a write command uses both an address and data. When both the WREADY and WVALID signals are raised, data is received by the circuit 500 from the AXI primary in one or more of the FIFOs 510C-510F. The received data is provided to the MUX 525, which selects the valid data and provides it to the MUX 555, which reorganizes and encapsulates the data into data flits (e.g., a flit comprising fields 480 and 485 of FIG. 4). Thus, the header of a CPI packet for a write command is formed by the arbitrator 560 when a write address is received from the AXI primary and the body of the CPI packet is formed by the MUX 555 when write data is received. After the write address has been received into the AWFIFO and the write data has been received into the WFIFO, the completed CPI packet is provided to the CPI network.

Figure 6:
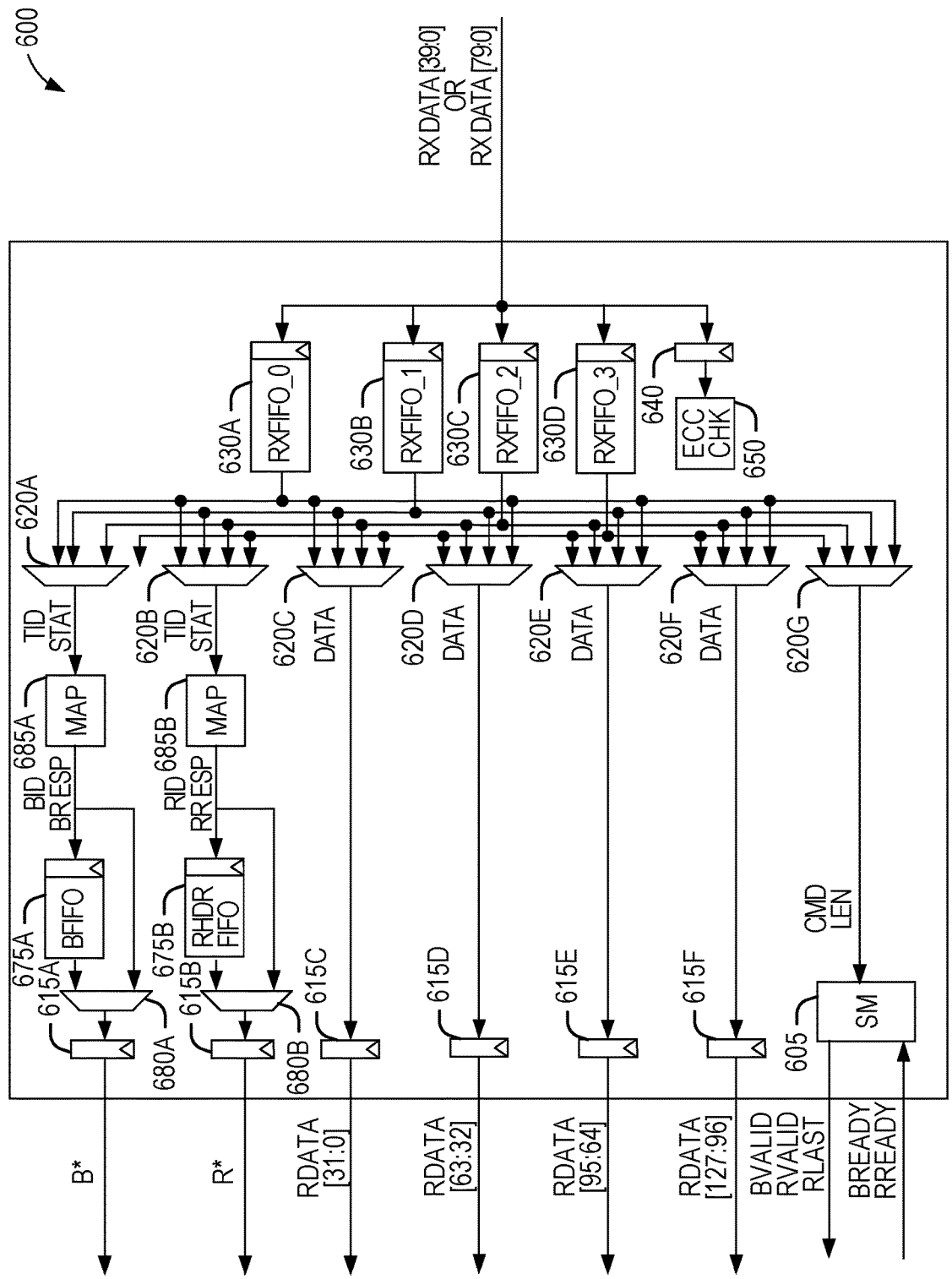
FIG. 6 is a block diagram of a circuit that converts CPI packets to signals to an AXI primary, in accordance with some embodiments of the present disclosure.

FIG. 6 is a block diagram of a circuit 600 that converts CPI packets to signals to an AXI primary, in accordance with some embodiments of the present disclosure. The circuit 600 includes a state machine 605; first in first out (FIFO) buffers (also referred to as FIFOs) 630A, 630B, 630C, 630D, 675A, and 675B; registers 615A, 615B, 615C, 615D, 615E, 615F, and 640; multiplexers (MUXes) 620A, 620B, 620C, 620D, 620E, 620F, 620G, 680A, and 680B; ECC checker 650; and mappers 685A and 685B. The components of the circuit 600 are connected via hardware traces, buses, or other physical connections. In some example embodiments, the circuit 500 and the circuit 600 are integrated and various components of the circuits 500 and 600 are also connected via hardware traces, buses, or other physical connections.

The left side of the circuit 600 is connected to an AXI primary device. The right side of the circuit 600 is connected to a CPI network. The circuit 600 receives CPI packets from the CPI network and provides corresponding AXI signals to the AXI primary device.

The circuit 600 receives data from the CPI network using the FIFOs 630A-630D. Input data is also provided to the register 640, for processing by the ECC checker 650. The received data is processed by one or more of the MUXes 620A-620G to set data in the registers 615C-615F, if the received CPI packet contains read data; to send the appropriate RVALID, BVALID, and BLAST signals; and, using the mappers 685A and 685B, to map the transaction ID of the CPI packet to an AXI write response identifier (BID) or read data identifier (RID), this mapping having been established and recorded in the mapper when the primary issued the CPI request corresponding to the CPI response, and send the appropriate signal on the write response channel or the read data channel using the registers 615A and 615B.

The state machine 605 provides BVALID, RVALID, and RLAST signals to the AXI primary and receives BREADY and RREADY signals from the AXI primary. The BVALID signal, if raised, indicates that the circuit 600 is providing a write response signal in the register 615A. The RVALID signal, if raised, indicates that the circuit 600 is providing read data in one or more of the registers 615B-615F. The RLAST signal, if raised, indicates that the current read data is the last read transfer of a burst. The BREADY signal, if raised, indicates that the AXI primary is accepting the write response signal from the register 615A. The RREADY signal, if raised, indicates that the AXI primary is accepting the read data from the registers 615B-615F. Thus, by use of the circuits 500 and 600, an AXI primary is enabled to communicate with other devices over a CPI network, without requiring modification of the AXI primary.

Figure 7:
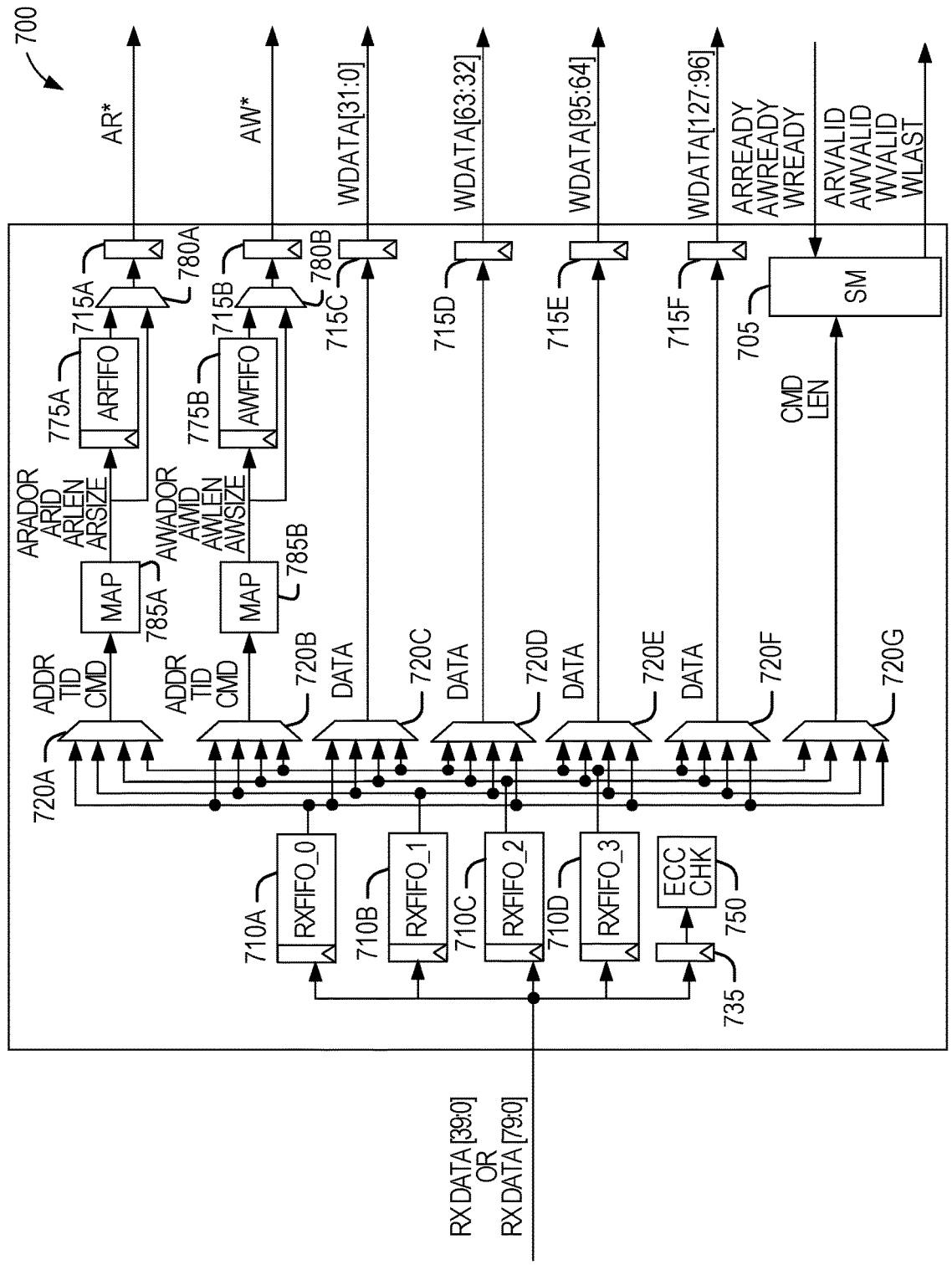
FIG. 7 is a block diagram of a circuit that converts CPI packets to signals to an AXI secondary, in accordance with some embodiments of the present disclosure.

FIG. 7 is a block diagram of a circuit 700 that converts CPI packets to signals to an AXI secondary, in accordance with some embodiments of the present disclosure. The circuit 700 includes a state machine 705; FIFO buffers (also referred to as FIFOs) 710A, 710B, 710C, 710D, 775A, and 775B; registers 715A, 715B, 715C, 715D, 715E, 715F, and 735; multiplexers (MUXes) 720A, 720B, 720C, 720D, 720E, 720F, 720G, 780A, and 780B; ECC checker 750; and mappers 785A and 785B. The components of the circuit 700 are connected via hardware traces, buses, or other physical connections.

The right side of the circuit 700 is connected to an AXI secondary device. The left side of the circuit 700 is connected to a CPI network. The circuit 700 receives read and write request packets from the CPI network and provides corresponding AXI signals to the AXI secondary device.

A CPI packet is received via the FIFOs 710A-710D. A portion of the CPI packet is provided to the register 735 for error checking by the ECC checker 750. The received CPI packet is processed by the MUXes 720A-720G to determine the command contained in the CPI packet and to extract an address of the command. For example, the mappers 785A and 785B may determine the identifier (e.g., read address identifier (ARID) or write address identifier (AWID)) to use based on the TID and command fields of the incoming CPI packet. The ID and address are provided to the corresponding FIFO (e.g., the FIFO buffer 775A or 775B) and to the corresponding MUX 780A or 780B. The MUX selects between an output of a FIFO buffer and the current output of a mapper and provides the correct address to the register 715A for a read command or to the register 715B for a write command. Write data is provided in one or more of the registers 715C-715F.

The state machine 705 receives ARREADY, AWREADY, and WREADY signals from the AXI secondary. Each signal indicates, if raised, that the AXI secondary is ready to receive a corresponding input. The ARREADY signal, if raised, indicates that the AXI secondary is ready to receive a read address. The AWREADY signal, if raised, indicates that the AXI secondary is ready to receive a write address. The WREADY signal, if raised, indicates that the AXI secondary is ready to receive write data.

The state machine 705 provides ARVALID, AWVALID, and WVALID signals to the AXI secondary, each of which may be raised to indicate that a corresponding input is valid or lowered to indicate that the corresponding input is not valid. The ARVALID signal, when raised, indicates that the circuit 700 is providing a valid read address to the register 715A. The AWVALID signal, when raised, indicates that the circuit 700 is providing a valid write address to the FIFO 715B. The WVALID signal, when raised, indicates that the circuit 700 is providing valid write data to one or more of the registers 715C-715F.

Thus, when both the ARREADY and ARVALID signals are raised, the AXI secondary processes the read address provided by the circuit 700 in the read address register 715A. Similarly, when both the AWREADY and AWVALID signals are raised, the AXI secondary processes the write address provided by the circuit 700 in the write address FIFO 715B.

Figure 8:
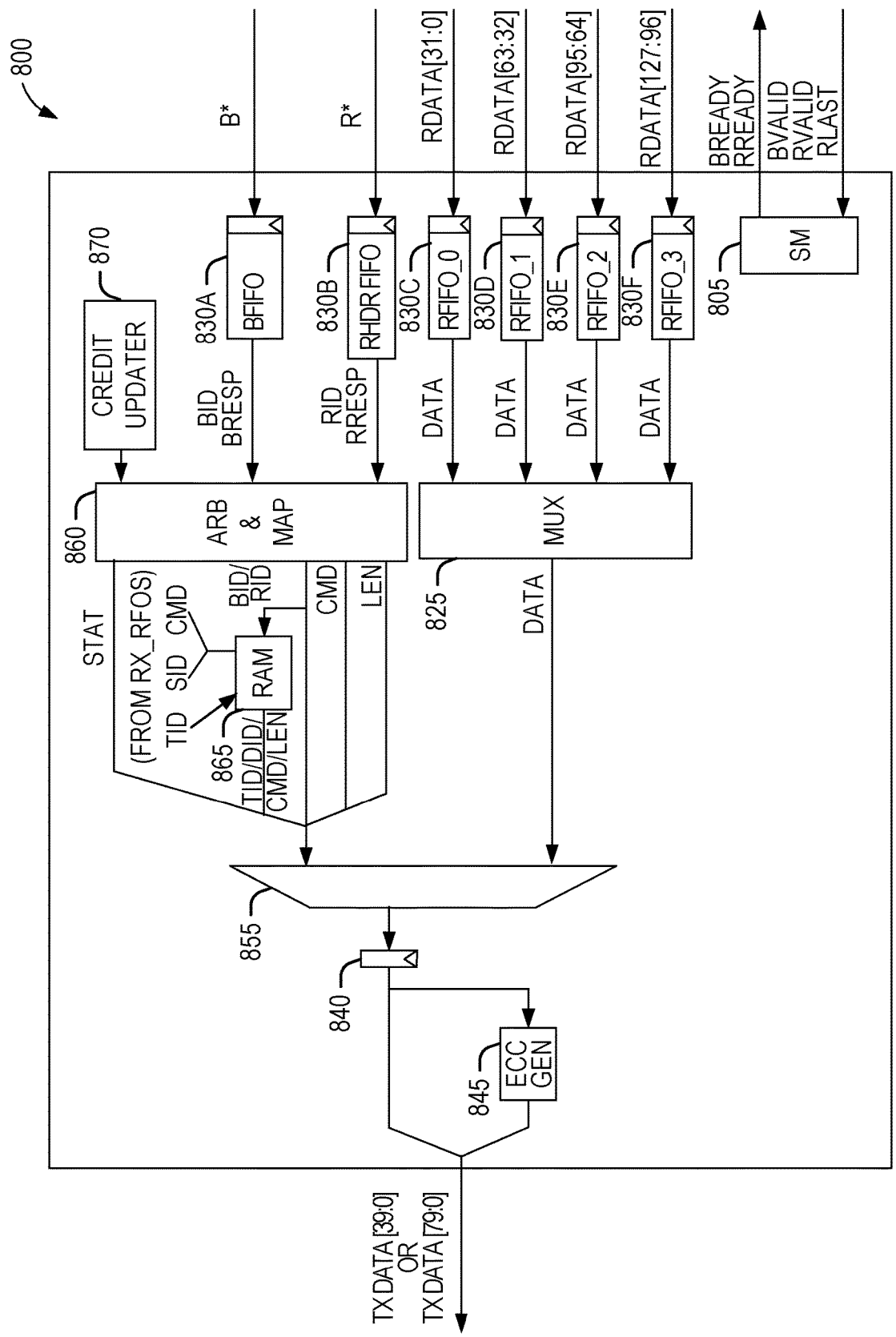
FIG. 8 is a block diagram of a circuit that converts signals from an AXI secondary to CPI packets, in accordance with some embodiments of the present disclosure.

FIG. 8 is a block diagram of a circuit 800 that converts signals from an AXI secondary to CPI packets, in accordance with some embodiments of the present disclosure. The circuit 800 includes a state machine 805; FIFO buffers (also referred to as FIFOs) 830A, 830B, 830C, 830D, 830E, and 830F; register 840; MUXes 825 and 855; error correction code (ECC) generator 845; arbitrator 860; memory 865 (e.g., RAM); and credit updater 870. The components of the circuit 800 are connected via hardware traces, buses, or other physical connections. In some example embodiments, the circuit 700 and the circuit 800 are integrated and various components of the circuits 700 and 800 are also connected via hardware traces, buses, or other physical connections.

The right side of the circuit 800 is connected to an AXI secondary device. The left side of the circuit 800 is connected to a CPI network. The circuit 800 receives AXI response signals from the AXI secondary device and provides corresponding CPI packets to the CPI network.

For a write response, no data need be returned, only an acknowledgement that the write was successfully handled. The arbitrator 860 verifies with the credit updater 870 that sufficient credits are available on a virtual channel corresponding to a write response (e.g., virtual channel 1) and updates the available credits for the virtual channel. Each field of the CPI packet is either statically defined by the circuit 800 (e.g., the source identifier), or dynamically defined by the circuit 800 based on the AXI signals (e.g., using the BID provided by the AXI secondary to look up information stored in the memory 865 that had been received earlier in the corresponding CPI write request packet, such as the CPI transaction ID, source ID, and command, to determine the response packet's transaction ID, destination ID, command and length). The CPI packet is provided to the MUX 855 and held in the register 840 for access by the ECC generator 845. The generated CPI packet is provided to the CPI network.

Unlike a write response, a read response uses data. When both the RREADY and RVALID signals are raised, data is received by the circuit 800 from the AXI secondary in one or more of the FIFOs 830C-830F. The received data is provided to the MUX 825, which selects the valid data and provides it to the MUX 855, which reorganizes and encapsulates the data into data flits (e.g., a flit comprising fields 480 and 485 of FIG. 4). Thus, the header of a CPI packet for a read data response command is formed by both the arbitrator 860 and memory 865 and the body of the CPI packet is formed by the MUX 855, when read data is received from the AXI secondary. Each field of the CPI packet is either provided by the AXI secondary (e.g., the data), statically defined by the circuit 800 (e.g., the source identifier), or dynamically defined by the circuit 800 based on the AXI signals (e.g., using the RID provided by the AXI secondary to look up information stored in the memory 865 that had been received earlier in the corresponding CPI read request packet, such as the CPI transaction ID, source ID, and command, to determine the response packet's transaction ID, destination ID, command and length. The completed CPI packet is provided to the CPI network.

The state machine 805 receives BVALID, RVALID, and RLAST signals from the AXI secondary and provides BREADY and RREADY signals to the AXI secondary. The BVALID signal, if raised, indicates that the AXI secondary is providing a write response signal to the buffer 830A. The RVALID signal, if raised, indicates that the AXI secondary is providing read data to one or more of the buffers 830B-830F. The RLAST signal, if raised, indicates that the current read data is the last read transfer of a burst. The BREADY signal, if raised, indicates that the circuit 800 is accepting the write response signal from the buffer 830A. The RREADY signal, if raised, indicates that the circuit 800 is accepting the read data from the buffers 830B-830F. Thus, by use of the circuits 700 and 800, an AXI secondary is enabled to communicate with other devices over a CPI network, without requiring modification of the AXI secondary.

Figure 9:
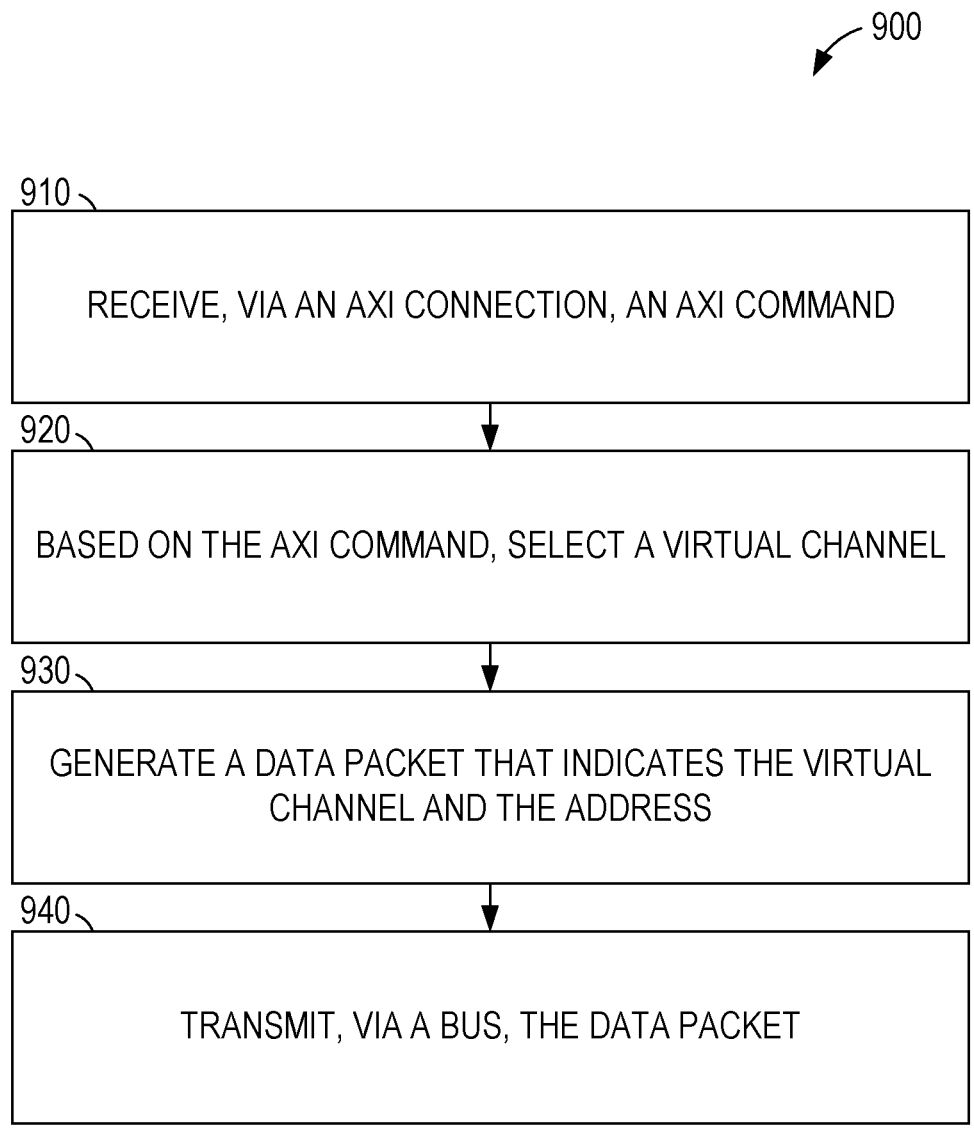
FIG. 9 is a flow chart showing operations of a method performed by a circuit in converting AXI signals to packets, in accordance with some embodiments of the present disclosure.

FIG. 9 is a flow chart showing operations of a method 900 performed by a circuit in converting AXI signals to packets, in accordance with some embodiments of the present disclosure. The method 900 includes operations 910, 920, 930, and 940. By way of example and not limitation, the method 900 is described as being performed by the devices of FIGS. 1-3 and 5-8, using the data packet of FIG. 4.

In operation 910, a circuit (e.g., the circuit 500 of FIG. 5 or the circuit 800 of FIG. 8) receives, via an AXI connection, an AXI command. For example, the AW* signal or AR* signal shown in FIG. 5 may be received by the circuit 500 and associated with a Write Request or Read Request command, respectively. As another example, the B* or R* signal shown in FIG. 8 may be received by the circuit 800 and associated with a Write Response or Read Response command, respectively.

Based on the AXI command, the circuit selects, in operation 920, a virtual channel. For example, virtual channel 0 may be selected for a Write Request, virtual channel 1 for a Write Response, virtual channel 2 for a Read Request, or virtual channel 3 for a Read Response.

In operation 930, the circuit generates a data packet that indicates the virtual channel. For example, the data packet 400 may be generated, in which the virtual channel is indicated as part of the command field 430. For commands associated with an address (e.g., a read command that reads from the address or a write command that writes to the address, either of which may be received from an AXI primary device), address fields 435, 445, and 460 are populated with the address.

The circuit, in operation 940, transmits, via a bus, the data packet. For example, the circuit 500 and the circuit 800 may be components of the memory controller chiplet 205, allowing the memory controller chiplet 205 to interface both with an AXI device and the chiplet network 285. Alternatively, the circuit 500 and the circuit 800 may be components of a different chiplet (e.g., the chiplet 310D), in communication with a memory controller chiplet (e.g., the chiplet 310A). Thus, an AXI device is enabled, by use of the circuit 500 and the circuit 800, to communicate using a chiplet network with a chiplet device.

With minor modifications, the method 900 may be used with protocols other than AXI and CPI. For example, in a modified operation 910, a circuit receives, via a first connection, a command of a first protocol. The command may be received on a dedicated connection for the command (e.g., using separate dedicated address lines for read and write). Alternatively, a signal may be received that indicates the command (e.g., a multi-bit connection that indicates one of multiple possible commands; two single-wire connections that are both low when no address is provided, wherein one is high when a read address is a provided, and the other is high when a write address is provided; or any suitable combination thereof), and, in response to detecting the command, the address is read from a common connection.

Continuing with this modified example, in a modified operation 920, the virtual channel is selected based on the command of the first protocol. In a modified operation 930, a packet for the command is generated for a second protocol. The circuit transmits, in a modified operation 940, the data packet using the second protocol. Thus, by use of the modified method 900, commands received via a first protocol are converted to packets using virtual channels that are transmitted (e.g., over a network) using a second protocol. In some example embodiments, the modified method 900 is used by a bridge between two packet-based networks of different protocols. In other example embodiments, the modified method 900 is used to interface between a direct-wired protocol such as AXI and a packet-based network using a protocol such as CPI, as described for the unmodified method 900.

Figure 10:
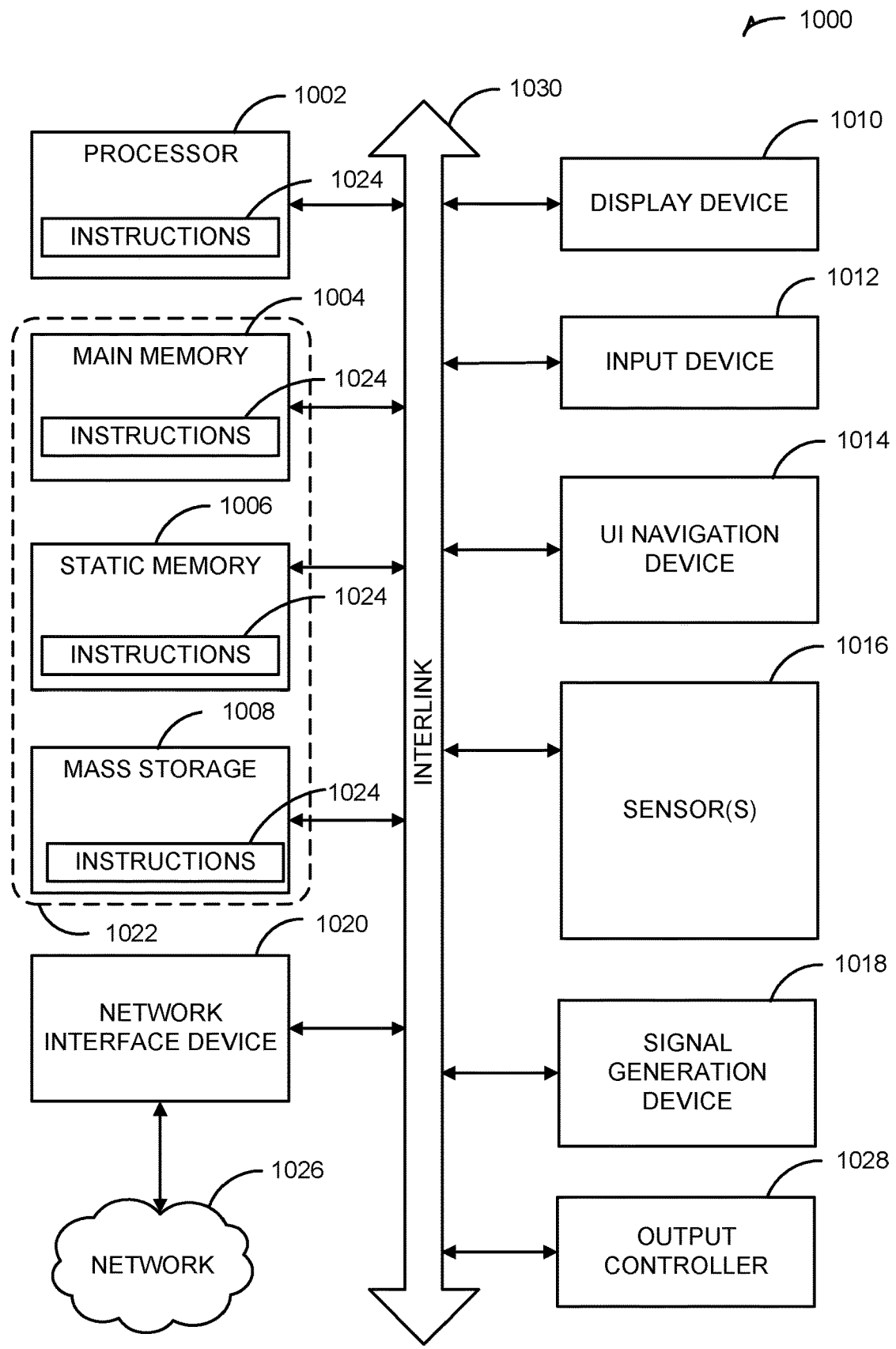
FIG. 10 is a block diagram of an example computer system in which embodiments of the present disclosure may operate.

FIG. 10 illustrates a block diagram of an example machine 1000 with which, in which, or by which any one or more of the techniques (e.g., methodologies) discussed herein can be implemented. Examples, as described herein, can include, or can operate by, logic or a number of components, or mechanisms in the machine 1000. Circuitry (e.g., processing circuitry) is a collection of circuits implemented in tangible entities of the machine 1000 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 1000 follow.

In alternative embodiments, the machine 1000 can operate as a standalone device or can be connected (e.g., networked) to other machines. In a networked deployment, the machine 1000 can operate in the capacity of a server machine, a client machine, or both in server-client network environments. In an example, the machine 1000 can act as a peer machine in peer-to-peer (P2P) (or other distributed) network environment. The machine 1000 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1000 can include a hardware processor 1002 (e.g., a central processing unit (CPU), a graphics processing unit (GPU), a hardware processor core, or any combination thereof), a main memory 1004, a static memory (e.g., memory or storage for firmware, microcode, a basic-input-output (BIOS), unified extensible firmware interface (UEFI), etc.) 1006, and mass storage 1008 (e.g., hard drives, tape drives, flash storage, or other block devices) some or all of which can communicate with each other via an interlink (e.g., bus) 1030. The machine 1000 can further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 can be a touch screen display. The machine 1000 can additionally include a storage device (e.g., drive unit) 1008, a signal generation device 1018 (e.g., a speaker), a network interface device 1020, and one or more sensors 1016, such as a global positioning system (GPS) sensor, compass, accelerometer, or other sensor. The machine 1000 can include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1002, the main memory 1004, the static memory 1006, or the mass storage 1008 can be, or include, a machine-readable medium 1022 on which is stored one or more sets of data structures or instructions 1024 (e.g., software) embodying or utilized by any one or more of the techniques or functions described herein. The instructions 1024 can also reside, completely or at least partially, within any of registers of the processor 1002, the main memory 1004, the static memory 1006, or the mass storage 1008 during execution thereof by the machine 1000. In an example, one or any combination of the hardware processor 1002, the main memory 1004, the static memory 1006, or the mass storage 1008 can constitute the machine-readable media 1022. While the machine-readable medium 1022 is illustrated as a single medium, the term "machine-readable medium" can include a single medium or multiple media (e.g., a centralized or distributed database, or associated caches and servers) configured to store the one or more instructions 1024.

The term "machine-readable medium" can include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine-readable media that do not include transitory propagating signals. Specific examples of non-transitory machine-readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable medium 1022 can be representative of the instructions 1024, such as instructions 1024 themselves or a format from which the instructions 1024 can be derived. This format from which the instructions 1024 can be derived can include source code, encoded instructions (e.g., in compressed or encrypted form), packaged instructions (e.g., split into multiple packages), or the like. The information representative of the instructions 1024 in the machine-readable medium 1022 can be processed by processing circuitry into the instructions to implement any of the operations discussed herein. For example, deriving the instructions 1024 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1024.

In an example, the derivation of the instructions 1024 can include assembly, compilation, or interpretation of the information (e.g., by the processing circuitry) to create the instructions 1024 from some intermediate or preprocessed format provided by the machine-readable medium 1022. The information, when provided in multiple parts, can be combined, unpacked, and modified to create the instructions 1024. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1024 can be further transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1020 can include one or more physical jacks (e.g., Ethernet, coaxial, or phone jacks) or one or more antennas to connect to the communications network 1026. In an example, the network interface device 1020 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software. A transmission medium is a machine readable medium.

In the foregoing specification, some example implementations of the disclosure have been described. The specification and drawings are to be regarded in an illustrative sense rather than in a restrictive sense. Below is a non-exhaustive list of examples of implementations of the present disclosure.

Example 1 is a system comprising: an interface to a physical channel; a bus interface to a bus; and logic configured to perform operations comprising: detecting, via the interface, a ready signal on the physical channel; based on the ready signal being detected on the physical channel, identifying a command; based on the command, selecting a virtual channel; generating a data packet that indicates the virtual channel; and transmitting, via the bus interface, the data packet.

In Example 2, the subject matter of Example 1 includes, wherein the transmitting of the data packet comprises transmitting the data packet to a memory controller chiplet.

In Example 3, the subject matter of Examples 1-2 includes, wherein: the selecting of the virtual channel based on the command comprises selecting virtual channel 2 based on the command being a read request.

In Example 4, the subject matter of Examples 1-3 includes, wherein: the interface to the physical channel is a first interface to a first physical channel; the system further comprises: a second interface to a second physical channel; the operations further comprise: receiving, via the second interface and from a primary device, an address associated with the command; and the data packet further indicates the address.

In Example 5, the subject matter of Example 4 includes, wherein: the receiving of the address is based on the detection of the ready signal.

In Example 6, the subject matter of Examples 1-5 includes, wherein: the interface to the physical channel is a first interface to a first physical channel; the system further comprises: a second interface to a second physical channel; the operations further comprise: receiving, via the second interface and from a secondary device, a response associated with the command; and the data packet further indicates the response.

In Example 7, the subject matter of Examples 1-6 includes, wherein: the interface to the physical channel is a first interface to a first physical channel; the system further comprises: a second interface to a second physical channel; the operations further comprise: receiving, via the second interface, data associated with the command; and the generated data packet further comprises the data.

In Example 8, the subject matter of Examples 1-7 includes, wherein: the selecting of the virtual channel based on the command comprises selecting virtual channel 0 based on the command being a write request.

Example 9 is a method comprising: detecting, via an interface to a physical channel, a ready signal on the physical channel; based on the ready signal being detected on the physical channel, identifying a command; based on the command, selecting a virtual channel; generating a data packet that indicates the virtual channel; and transmitting, via a bus, the data packet.

In Example 10, the subject matter of Example 9 includes, wherein the transmitting of the data packet comprises transmitting the data packet to a memory controller chiplet.

In Example 11, the subject matter of Examples 9-10 includes, wherein: the selecting of the virtual channel based on the command comprises selecting virtual channel 2 based on the command being a read request.

In Example 12, the subject matter of Examples 9-11 includes, wherein: the interface to the physical channel is a first interface to a first physical channel; the method further comprises: receiving, via a second interface to a second physical channel and from a primary device, an address associated with the command; and the data packet further indicates the address.

In Example 13, the subject matter of Example 12 includes, wherein: the receiving of the address is based on the detection of the ready signal.

In Example 14, the subject matter of Examples 9-13 includes, wherein: the interface to the physical channel is a first interface to a first physical channel; the method further comprises: receiving, via a second interface to a second physical channel and from a secondary device, a response associated with the command; and the data packet further indicates the response.

In Example 15, the subject matter of Examples 9-14 includes, wherein: the interface to the physical channel is a first interface to a first physical channel; the method further comprises: receiving, via a second interface to a second physical channel, data associated with the command; and the generated data packet further comprises the data.

In Example 16, the subject matter of Examples 9-15 includes, wherein: the selecting of the virtual channel based on the command comprises selecting virtual channel 0 based on the command being a write request.

Example 17 is a non-transitory machine-readable medium that stores instructions that, when executed by a system, cause the system to perform operations comprising: detecting, via an interface to a physical channel, a ready signal on the physical channel; based on the ready signal being detected on the physical channel, identifying a command; based on the command, selecting a virtual channel; generating a data packet that indicates the virtual channel; and transmitting, via a bus, the data packet.

In Example 18, the subject matter of Example 17 includes, wherein the transmitting of the data packet comprises transmitting the data packet to a memory controller chiplet.

In Example 19, the subject matter of Examples 17-18 includes, wherein: the selecting of the virtual channel based on the command comprises selecting virtual channel 2 based on the command being a read request.

In Example 20, the subject matter of Examples 17-19 includes, wherein: the interface to the physical channel is a first interface to a first physical channel; the operations further comprise: receiving, via a second interface to a second physical channel and from a primary device, an address associated with the command; and the data packet further indicates the address.

In Example 21, the subject matter of Example 20 includes, wherein: the receiving of the address is based on the detection of the ready signal.

In Example 22, the subject matter of Examples 17-21 includes, wherein: the interface to the physical channel is a first interface to a first physical channel; the operations further comprise: receiving, via a second interface to a second physical channel and from a secondary device, a response associated with the command; and the data packet further indicates the response.

In Example 23, the subject matter of Examples 17-22 includes, wherein: the interface to the physical channel is a first interface to a first physical channel; the operations further comprise: receiving, via a second interface to a second physical channel, data associated with the command; and the generated data packet further comprises the data.

In Example 24, the subject matter of Examples 17-23 includes, wherein: the selecting of the virtual channel based on the command comprises selecting virtual channel 0 based on the command being a write request.

Example 25 is at least one machine-readable medium including instructions that, when executed by processing circuitry, cause the processing circuitry to perform operations to implement of any of Examples 1-24.

Example 26 is an apparatus comprising means to implement of any of Examples 1-24.

Example 27 is a system to implement of any of Examples 1-24.

Example 28 is a method to implement of any of Examples 1-24.

What is claimed is:

1. A system comprising:
an interface to a physical channel;
a bus interface to a bus; and
logic configured to perform operations comprising:
  detecting, via the interface, a ready signal on the physical channel;
  based on the ready signal being detected on the physical channel, identifying a command;

based on the command, selecting a virtual channel;
generating a data packet that indicates the virtual channel; and
transmitting, via the bus interface, the data packet to a memory controller chiplet that is integrated on an interposer.

2. The system of claim 1, wherein:
the selecting of the virtual channel based on the command comprises selecting virtual channel 2 based on the command being a read request.

3. The system of claim 1, wherein:
the interface to the physical channel is a first interface to a first physical channel;
the system further comprises:
a second interface to a second physical channel;
the operations further comprise:
receiving, via the second interface and from a primary device, an address associated with the command; and
the data packet further indicates the address.

4. The system of claim 3, wherein:
the receiving of the address is based on the detection of the ready signal.

5. The system of claim 1, wherein:
the interface to the physical channel is a first interface to a first physical channel;
the system further comprises:
a second interface to a second physical channel;
the operations further comprise:
receiving, via the second interface and from a secondary device, a response associated with the command; and
the data packet further indicates the response.

6. The system of claim 1, wherein:
the interface to the physical channel is a first interface to a first physical channel;
the system further comprises:
a second interface to a second physical channel;
the operations further comprise:
receiving, via the second interface, data associated with the command; and
the generated data packet further comprises the data.

7. The system of claim 1, wherein:
the selecting of the virtual channel based on the command comprises selecting virtual channel 0 based on the command being a write request.

8. The system of claim 1, wherein the bus interface is connected to a chiplet mesh.

9. A method comprising:
detecting, via an interface to a physical channel, a ready signal on the physical channel;
based on the ready signal being detected on the physical channel, identifying a command;
based on the command, selecting a virtual channel;
generating a data packet that indicates the virtual channel; and
transmitting, via a bus, the data packet to a memory controller chiplet that is integrated on an interposer.

10. The method of claim 9, wherein:
the selecting of the virtual channel based on the command comprises selecting virtual channel 2 based on the command being a read request.

11. The method of claim 9, wherein:
the interface to the physical channel is a first interface to a first physical channel;
the method further comprises:
receiving, via a second interface to a second physical channel and from a primary device, an address associated with the command; and
the data packet further indicates the address.

12. The method of claim 11, wherein:
the receiving of the address is based on the detection of the ready signal.

13. The method of claim 9, wherein:
the interface to the physical channel is a first interface to a first physical channel;
the method further comprises:
receiving, via a second interface to a second physical channel and from a secondary device, a response associated with the command; and
the data packet further indicates the response.

14. The method of claim 9, wherein:
the interface to the physical channel is a first interface to a first physical channel;
the method further comprises:
receiving, via a second interface to a second physical channel, data associated with the command; and
the generated data packet further comprises the data.

15. The method of claim 9, wherein:
the selecting of the virtual channel based on the command comprises selecting virtual channel 0 based on the command being a write request.

16. The method of claim 9, wherein the bus interface is connected to a chiplet mesh.

17. A non-transitory machine-readable medium that stores instructions that, when executed by a system, cause the system to perform operations comprising:
detecting, via an interface to a physical channel, a ready signal on the physical channel;
based on the ready signal being detected on the physical channel, identifying a command;
based on the command, selecting a virtual channel;
generating a data packet that indicates the virtual channel; and
transmitting, via a bus, the data packet to a memory controller chiplet that is integrated on an interposer.

18. The non-transitory machine-readable medium of claim 17, wherein:
the selecting of the virtual channel based on the command comprises selecting virtual channel 2 based on the command being a read request.

19. The non-transitory machine-readable medium of claim 17, wherein:
the interface to the physical channel is a first interface to a first physical channel;
the operations further comprise:
receiving, via a second interface to a second physical channel and from a primary device, an address associated with the command; and
the data packet further indicates the address.

20. The non-transitory machine-readable medium of claim 19, wherein:
the receiving of the address is based on the detection of the ready signal.

21. The non-transitory machine-readable medium of claim 17, wherein:
the interface to the physical channel is a first interface to a first physical channel;
the operations further comprise:
receiving, via a second interface to a second physical channel and from a secondary device, a response associated with the command; and
the data packet further indicates the response.

22. The non-transitory machine-readable medium of claim 17, wherein:
   the interface to the physical channel is a first interface to a first physical channel;
   the operations further comprise:
      receiving, via a second interface to a second physical channel, data associated with the command; and
   the generated data packet further comprises the data.

23. The non-transitory machine-readable medium of claim 17, wherein:
   the selecting of the virtual channel based on the command comprises selecting virtual channel 0 based on the command being a write request.

24. The non-transitory machine-readable medium of claim 17, wherein the bus interface is connected to a chiplet mesh.

\* \* \* \* \*